United States Patent
Wigren et al.

(10) Patent No.: US 12,034,644 B2
(45) Date of Patent: Jul. 9, 2024

(54) METHODS, APPARATUS AND MACHINE-READABLE MEDIA RELATING TO TRANSMISSION AND RECONSTRUCTION OF DATA STREAMS USING DATA DUPLICATION

(71) Applicant: Telefonaktiebolaget LM Ericsson (PUBL), Stockholm (SE)

(72) Inventors: Torbjörn Wigren, Uppsala (SE); Ramon Delgado, Elermore Vale (AU); Katrina Lau, Wallsend (AU); Richard Middleton, North Lambton (AU); Ying Sun, Täby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 348 days.

(21) Appl. No.: 17/637,887

(22) PCT Filed: Sep. 10, 2020

(86) PCT No.: PCT/SE2020/050850
§ 371 (c)(1),
(2) Date: Feb. 24, 2022

(87) PCT Pub. No.: WO2021/049994
PCT Pub. Date: Mar. 18, 2021

(65) Prior Publication Data
US 2022/0286403 A1 Sep. 8, 2022

Related U.S. Application Data

(60) Provisional application No. 62/899,788, filed on Sep. 13, 2019.

(51) Int. Cl.
*H04L 47/34* (2022.01)
*H04W 72/20* (2023.01)
*H04W 76/15* (2018.01)

(52) U.S. Cl.
CPC .......... *H04L 47/34* (2013.01); *H04W 72/20* (2023.01); *H04W 76/15* (2018.02)

(58) Field of Classification Search
CPC .......... H04L 47/34; H04L 1/08; H04L 67/12; H04W 76/15; H04W 72/02; H04W 72/20;
(Continued)

(56) References Cited

U.S. PATENT DOCUMENTS

| 2008/0039057 A1 | 2/2008 | Worrall et al. |
| 2016/0285643 A1 | 9/2016 | Verma |
| 2018/0376457 A1 | 12/2018 | Tseng et al. |

FOREIGN PATENT DOCUMENTS

| CN | 102930023 A | 2/2013 |
| CN | 109952725 A | 6/2019 |

(Continued)

OTHER PUBLICATIONS

3GPP TR 23.725 v16.0.0; Technical Report; 3rd Generation Partnership Project; Technical Specification Group Services and System Aspects; Study on enhancement of Ultra-Reliable Low-Latency Communication (URLLC) support in the 5G Core network (5GC) (Release 16)—Dec. 2018.

(Continued)

*Primary Examiner* — Mandish K Randhawa
(74) *Attorney, Agent, or Firm* — Baker Botts L.L.P.

(57) ABSTRACT

The disclosure provides, inter alia, a method performed by a wireless receiving node for receiving a data stream from one or more wireless transmitting nodes, the data stream comprising a sequence of data items. The method comprising: receiving an indication of an algorithm from a wireless transmitting node of the one or more wireless transmitting nodes; receiving a plurality of data packets from the one or more wireless transmitting nodes, each data packet comprising respective duplicate copies of data items belonging (Continued)

to the data stream; and utilizing the algorithm to select, based on respective times at which the data packets are received, for each position in the sequence, one or more of the duplicate copies of data items for reconstruction of the data stream.

20 Claims, 22 Drawing Sheets

(58) Field of Classification Search
CPC .................. H04W 4/70; G05B 19/4185; G05B 2219/33192; G05B 2219/15026; H04N 21/21815; H04N 21/6582
See application file for complete search history.

(56) References Cited

FOREIGN PATENT DOCUMENTS

| EP | 2523400 A1 | 11/2012 |
|---|---|---|
| WO | 2016 078699 A1 | 5/2016 |
| WO | 2018 183022 A1 | 10/2018 |

OTHER PUBLICATIONS

ETSI GS NGP 008 v0.0.1; Next Generation Protocols (NGP); Mobile Deterministic Networking—Sep. 2017.
Feedback Control Applications in New Radio, Exploring Delay Control and Alignment by Richard H. Middleton et al.—Mar. 6, 2019.
Jitter Suppression for Very Low Latency Feedback Control Over NR by Torbjorn Wigren et al., IEEE—2020.
Reliability Oriented Dual Connectivity for URLLC Services in 5G New Radio by Nurul Huda Mahmood et al., IEEE—2018.
SA WG2 Meeting #128; Vilnius, LT; Source: Nokia, Nokia Shanghai Bell; Title: Solution for 5G URLLC in 5G System (S2-186802 (revision of S218xxxx))—Jul. 2-6, 2018.
SA WG2 Meeting #129bis; West Palm Beach, USA; Source: Nokia, Nokia Shanghai Bell; Title: Key Issue #1—Updates to Solution #7 (S2-1813125 (was S2-181xxxx))—Nov. 26-30, 2018.
PCT International Search Report issued for International application No. PCT/SE2020/050850—Jan. 15, 2021.
PCT Written Opinion of the International Searching Authority issued for International application No. PCT/SE2020/050850—Jan. 15, 2021.
Extended European Search Report issued for Application No. / Patent No. 20864193.6-1213 / 4029180 PCT/SE2020050850—Sep. 4, 2023.
Official Action issued for Chinese Patent Application No. 202080064066.0—Mar. 13, 2024.

| Use Case | End-to-End Delay | Jitter | Reliability |
|---|---|---|---|
| Discrete automation: motion control | 1 ms | 1 µs | 99.9999% |
| Discrete automation | 10 ms | 100 µs | 99.99% |
| Process automation: remote control | 50 ms | 20 ms | 99.9999% |
| Process automation: monitoring | 50 ms | 20 ms | 99.9% |
| Electricity distribution: medium voltage | 25 ms | 25 ms | 99.9% |
| Electricity distribution: high voltage | 5 ms | 1 ms | 99.9999% |
| Intelligent transport systems: infrastructure backhaul | 10 ms | 20 ms | 99.9999% |
| Tactile interaction | 0.5 ms | To be confirmed | 99.999% |

Fig. 1

METHODS, APPARATUS AND MACHINE-READABLE MEDIA RELATING TO TRANSMISSION AND RECONSTRUCTION OF DATA STREAMS USING DATA DUPLICATION

PRIORITY

This nonprovisional application is a U.S. National Stage Filing under 35 U.S.C. § 371 of International Patent Application Serial No. PCT/SE2020/050850 filed Sep. 10, 2020 and entitled "METHODS, APPARATUS AND MACHINE-READABLE MEDIA RELATING TO TRANSMISSION AND RECONSTRUCTION OF DATA STREAMS USING DATA DUPLICATION" which claims priority to U.S. Provisional Patent Application No. 62/899,788 filed Sep. 13, 2019 both of which are hereby incorporated by reference in their entirety.

TECHNICAL FIELD

Embodiments of the disclosure relate to wireless communication, and particularly to the transmission and reconstruction of data streams using data duplication.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Ultra-reliable and low-latency communication (URLLC) requirements specified for New Radio (NR) by the 3GPP are intended to handle a variety of new demanding wireless use cases. Such use cases appear in many technical fields, including the automotive safety field, in factory automation, as well as for augmented and virtual reality functionality with tactile feedback. The performance requirements are enhanced, relative to 4G mobile broadband capacity/spectral efficiency requirements, to include also stringent requirements on round trip latency and reliability. Typically the latency requirements may be as low as sub-millisecond values and the reliability requirements are packet loss probabilities as low as $10^{-6}$ to $10^{-4}$.

The table in FIG. 1 summarizes the current delay and reliability requirements of URLLC traffic in 3GPP.

One of the most important 5G use cases is the so-called critical machine type communications (C-MTC) use case. Typical applications in this class include tactile feedback for virtual reality applications that allow users to sense remote objects, safety critical automotive safety application like automatic braking and platooning, as well as industrial robot control where manufacturing flexibility is obtained by replacement of wired feedback control loops, by wireless ones. See a paper by R. H. Middleton et al for further details ("Feedback control applications in new radio—exploring delay control and alignment", IEEE Vehicular Technology Magazine, vol. 14, no. 2, pp. 70-77, June, 2019).

These applications all share a requirement to meet both the reliability requirement in terms of lost packets, at the same time as the delay and jitter requirements are met. A packet loss is defined as either a lost packet or a packet received at the application layer reception point with longer delay than the delay budget required. In this context it is very important to understand that a property of control loops is the requirement for real time feedback. In particular, a late control or feedback signal is in effect a lost piece of data. This is so since feedback control actions need to be based on the current system state. Delayed actions or measurements give past information, and it is well known (see the paper referenced above for example or numerous other control texts) that delay in feedback control systems can easily lead to instability.

A consequence of this is that the likelihood of excessively delayed packets needs to be accounted for when assessing reliability for C-MTC and URLLC applications.

Focusing on the reliability requirements, it is noted that the mobile broadband transmission system is optimized for operation at a block-error rate of 1-10%, meaning that without re-transmission error rates of perhaps $10^{-2}$ are achievable. Improvement of this value is impracticable since the measurement of statistics to achieve, say, a block-error rate of $10^{-6}$ would require data collection over $k(10^{-6})^{-1}$=k× $10^6$ transmission time intervals (TTIs), where k may be of the order of 100. With a TTI of 1 ms, this equates to 30 hours which is clearly infeasible as compared to the radio channel variation rate.

To solve this issue one may e.g. write $10^{-6}=(10^{-2})^3$. This relation hints to a solution by means of transmission of the URLLC data over three independent wireless interfaces, each with a conventional block-error rate of $10^{-2}$. Thus, the specified reliability requirements may be met by transmitting the same data (i.e. duplicated data) multiple times.

As motivated above, URLLC reliability requires that multiple mechanisms (such as independently fading wireless interfaces) are made available, over which multiple copies of each data item are transmitted. This is so in both the downlink (e.g., for C-MTC plant control signals) and the uplink (e.g., for C-MTC plant feedback and plant feedforward signals).

FIG. 2 shows a general block diagram of a C-MTC networked control system running over NR wireless interfaces. Here a data split is indicated at the so-called Packet Data Convergence Protocol (PDCP) layer.

The system comprises the following logical nodes: a controller node 210, one or more gNBs 220 and a plant node 230. The controller node 210 comprises one or more plant controllers 212, which send control signals to a plant module 232 implemented in the plant node 230, and which receive feedback and feedforward signals from the plant module 232. Both plant controllers 212 and plant modules 232 operate in the application layer. Delay control functions are performed by an outer loop round trip delay skew controller 214 and one or more inner loop round trip delay controllers 216 in the controller node 210, one or more transmit data queues 222 in the gNBs 220, and a User Equipment (UE) interface 234 in the plant node 230. FIG. 2 depicts an architecture where a data split at the so-called PDCP layer is performed, similar to previously standardized dual connectivity functionality.

Previously, it has been realized that since the wireless interfaces fade independently, the data rates scheduled over each wireless interface also vary independently. The transmission buffers of each wireless interface therefore also vary independently in terms of data volume. Finally, the network interfaces of FIG. 2 may also have varying delay characteristics. In summary, it is therefore well known that the delays over each application data path (plant control signals, plant feedback signals and plant feedforward signals) vary. To mitigate this problem, delay aligning control methods have been developed that aim to reduce delay and delay skew variations between the data paths. See the paper by Middleton referenced above for further details. However, these methods cannot handle the remaining high bandwidth random fluctuations that result from the inherent round trip delay and randomness of the wireless interface fading.

In FIG. 2, there is a point where the incoming data flow is split into multiple, typically duplicated data streams, to be transmitted over the independent wireless interfaces. One possibility for this split would be at the so-called Medium Access Control (MAC) layer where the scheduler algorithm schedules data read from the Radio Link Control (RLC) buffer. In the present context this allows the use of carrier aggregation to create multiple data streams. This setup is different from FIG. 2, in that there is only one network interface, one delay control loop, and one transmission buffer (the RLC buffer). The scheduler then feeds application data to different wireless interfaces by means of application data scheduling to each of the carriers that are each associated with one wireless interface. Similar functionality is used for uplink application data transmission from the UE.

The potential advantage of carrier aggregation is that the round trip delay over the wireless interface is very low and predictable, hence the delay variations between the data paths will be very small. However, the absolute delay variation now depends on the single delay control loop and the single RLC queue, meaning that the absolute delay variation may still be large.

Delay control and delay aligning control algorithms are discussed in the paper by Middleton referenced above and the references therein. Such algorithms usually exploit application data buffering and some kind of measurement of the round trip times. Existing algorithms include so-called adaptive queue management algorithms (AQMs) that may intentionally drop packets when the transmission queue delays become too high (see the Middleton paper), thereby causing the internet transmission control protocol to reduce the incoming data rate. Modern variants of these AQM algorithms, e.g. the bottleneck bandwidth and round trip propagation time (BBR) algorithm, use techniques to estimate the available transmission bandwidth, with minimal buffering. In principle, multiple parallel instances of such algorithms could provide delay control and delay alignment control. Recently, so-called delay skew control algorithms have been developed based on solid feedback control theory, see the Middleton paper for further information. Notably, these methods have been shown to provide high performing delay and delay alignment, assuming a PDCP split. The algorithms have also been proven to be globally stable, with some schemes being globally stable irrespective of the actual delays.

However, none of the above schemes has the ability to compensate for the remaining random delay variations that are caused by the actual underlying delay of the overall connection, together with the random fading of the wireless channels.

The existing scheduling and link adaptation algorithm is optimized for enhanced Mobile Broadband (eMBB) type of traffic with the objective of maximizing spectrum efficiency, bits/Hz. Typically, BLERtarget=10% is used as Hybrid Automatic Repeat Request (HARQ) operating point of the link adaptation. For other services, for example VoIP, BLERtarget of 1% is also used.

In order to support URLLC service, the only existing solution is to use a more robust link adaptation. For example to support one of the most critical URLLC services with extremely high reliability with a packet error rate (PER=1e-6) and low latency requirement (Packet Delay Budget, PDB=1 ms), the existing solution would need to use robust scheduling and link adaptation with an extremely low HARQ operating point (BLER target=$1e^{-6}$) and extremely short transmission interval. This is because the retransmission schemes in different layers will consume time domain resources, which are not possible under the extremely low packet delay budget. To obtain accurate performance at this extremely low HARQ operating point, an extremely high computational complexity would result, as well as a very high amount of statistics for the existing link adaptation algorithm to converge. This would not work well for a URLLC service with extremely low latency and high reliability requirement.

Thus there currently exist certain challenge(s). When using multiple wireless interfaces to enhance reliability for URLLC and C-MTC applications in NR, where plant control signals (downlink), plant feedback signals (uplink) and plant feedforward signals (uplink) are sent over the wireless interfaces, the remaining high bandwidth delay variations of the prior art algorithms are still far too large. The associated problems include:

- Increased percentage of delayed, and thereby lost, packages.
- A need for an additional back-off, obtained by using round trip delay setpoints of delay control and delay alignment algorithms that are several times lower than the URLLC/C-MTC delay requirement.
- In case of backoff, a reduced delay control sampling period, which increases the overhead, thereby reducing the capacity of the URLLC/C-MTC supporting NR wireless systems.

The factor by which the delay might increase may typically be of the order of 2-5.

FIG. 3 shows typical remaining delay variation after downlink delay skew control. The desired delay is set to 1 ms. However, to avoid delayed packets, an application delay of at least 3 ms needs to be assumed. Hence a backoff of at least a factor of 3 is needed in the present example.

SUMMARY

Certain aspects of the present disclosure and their embodiments may provide solutions to these or other challenges. For example, embodiments of the disclosure may solve the above problems by using new data processing algorithms and signaling means, that process at least a subset of a number of redundant transmissions of the same application data, over different independently fading wireless interfaces. A variety of solutions are proposed, including use of First received application data, resulting in minimum round trip delay.

Application data representing the middle delay, resulting in (close to) median round trip delay.

The k:th received application data, out of n transmitted data, resulting in a percentile round trip delay.

Advantages and disadvantages of the alternatives are outlined, by disclosure of simulated results.

Embodiments of the disclosure also disclose the application of the above algorithms in the UE (downlink) and in the gNB (uplink). Alternatives to split data (i.e. to perform data duplication) at the PDCP layer or the MAC layer are also disclosed.

In further embodiments, the number of simultaneous duplication transmission paths information may be introduced into the scheduler and link adaptation algorithm so that the reliability (e.g., packet error rate) requirement can be reached with the existing link adaptation algorithm on individual transmission path without introducing extremely low HARQ operating point (BLER target).

Finally, the disclosure also provides signaling for the configuration of the specific algorithm to be used at the receiver.

There are, proposed herein, various embodiments which address one or more of the issues disclosed herein. In one aspect, for example, there is a provided a method performed by a wireless receiving node for receiving a data stream from one or more wireless transmitting nodes. The data stream comprises a sequence of data items. The method comprises: receiving an indication of an algorithm from a wireless transmitting node of the one or more wireless transmitting nodes; receiving a plurality of data packets from the one or more wireless transmitting nodes, each data packet comprising respective duplicate copies of data items belonging to the data stream; and utilizing the algorithm to select, based on respective times at which the data packets are received, for each position in the sequence, one or more of the duplicate copies of data items for reconstruction of the data stream.

Apparatus and machine-readable media for performing the method outlined above are also provided. For example, the apparatus may be implemented in a wireless device (e.g., a UE) operating in downlink or a radio access network node (e.g., a base station, gNB, etc) operating in uplink.

In another aspect, there is provided a method performed by a first wireless transmitting node for transmitting a data stream to a wireless receiving node. The data stream comprises a sequence of data items. The method comprises: causing transmission of a plurality of data packets to the wireless receiving node, by one or more wireless transmitting nodes comprising the first wireless transmitting node, each data packet comprising respective duplicate copies of data items belonging to the data stream; and causing transmission to the wireless receiving node of an indication of an algorithm to be used by the wireless receiving node to select, based on respective times at which the data packets are received, for each position in the sequence, one or more of the duplicate copies of data items for reconstruction of the data stream.

Apparatus and machine-readable media for performing the method outlined above are also provided. For example, the apparatus may be implemented in a wireless device (e.g., a UE) operating in uplink or a radio access network node (e.g., a base station, gNB, etc) operating in downlink.

Certain embodiments may provide one or more technical advantage(s). For example, absolute delay in the round-trip time is significantly reduced, as well as the jitter.

BRIEF DESCRIPTION OF THE DRAWINGS

FIG. 1 shows the delay and reliability requirements of URLLC traffic.

DETAILED DESCRIPTION

Figure 2:
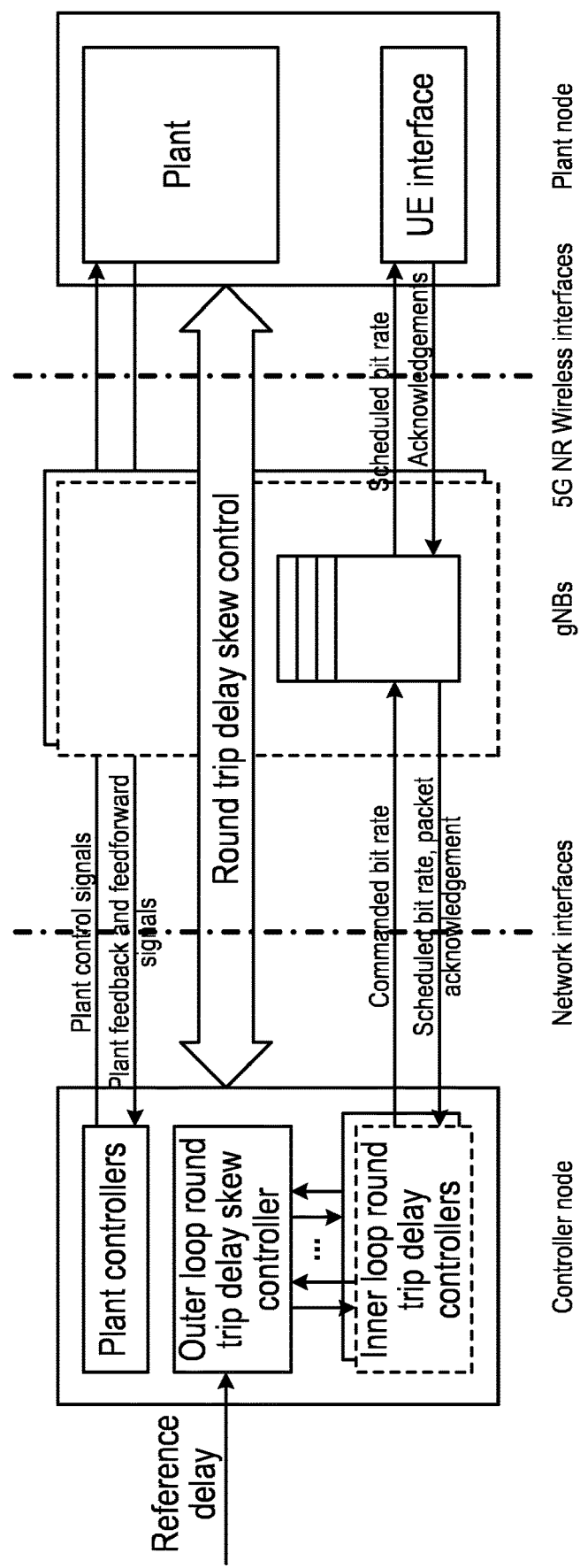
FIG. 2 shows a C-MTC networked control system.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Embodiments of the present disclosure solve the problems associated with the prior art (discussed above) by introducing methods for the processing of multiple received data packets comprising duplicate copies of data items belonging to a data stream. Receiving nodes utilize an algorithm to select, based on the respective times at which the data packets are received, and for each position in the sequence of the data stream, one or more of the duplicate copies of the data items for reconstruction of the data stream.

The algorithm may reduce or minimize one-way delay plus jitter, thereby reducing the effects of jitter. A variety of different algorithms may be used. For example, the algorithm may comprise selecting the first received duplicate copy for the reconstruction of the data stream. More generally, the algorithm may comprise selecting the kth received duplicate copy, where k is a positive integer greater than one.

The receiving nodes may receive an indication of the algorithm to be used, e.g., from one of the wireless transmitting nodes. For example, such an indication may be transmitted together with an indication or instruction to commence use of the algorithm.

The brief description above has referred to wireless transmitting nodes and wireless receiving nodes. Embodiments of the present disclosure are relevant in both uplink and downlink. Thus the methods described herein may be performed both by wireless devices (or UEs) and radio access network nodes (such as base stations, etc). In the downlink, the wireless transmitting node or nodes are radio access network nodes while the wireless receiving node is a wireless device; in the uplink, the wireless transmitting node is a wireless device, while the wireless receiving node is a radio access network node.

Further, it will be apparent that embodiments of the disclosure rely on the generation of duplicate copies of data items belonging to a data stream (e.g., a sequence of data items). It will be noted here that use of the term "duplicate" does not imply that only one duplicate is made of each data item (meaning two copies of each data item overall). Rather, embodiments of the present disclosure envisage the creation of any number of duplicates of data items to create a plurality of duplicate copies of each data item in the data stream.

Such duplication may occur in a number of different places within the processing architecture of the transmitting node or nodes. Two examples of such places are duplication in the PDCP layer and duplication in the MAC layer. In the former example, PDCP Service Data Units (SDUs) or Protocol Data Units (PDUs) are duplicated; in the latter example, MAC SDUs or PDUs are duplicated. It will be understood by those skilled in the art that such duplicated data items may be packaged with different data, control headers and suchlike, and thus the data packets which are ultimately transmitted to the receiving node are not duplicates of each other. However, those data packets comprise duplicate copies of the data items.

In the following, four examples are described in some detail: downlink communications, where data duplication occurs in the PDCP (FIG. 4) and MAC (FIG. 8) layers; and uplink communications where data duplication occurs in the PDCP (FIG. 9) and MAC (FIG. 10) layers. In each example, the data transmitted to the receiving node comprises control signals, such as for machinery or processing equipment in a plant, factory, etc. Thus references to "control signals" in the description of FIGS. 4-10 relate to data.

UE Processing—gNB PDCP Split

Figure 4:
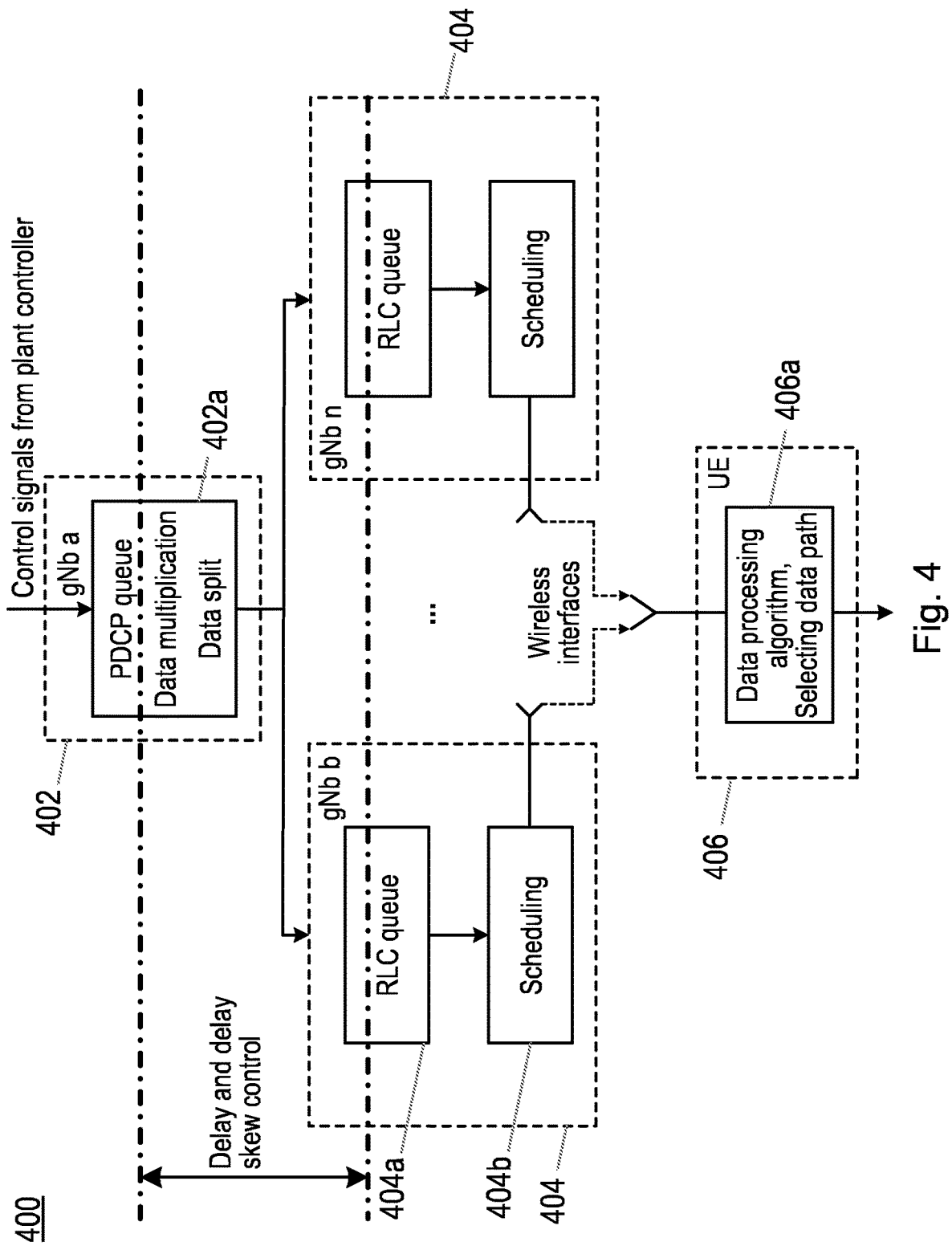
FIG. 4 shows a system according to embodiments of the disclosure.

FIG. 4 shows the architecture of a system 400 according to embodiments of the disclosure, in which downlink data is split at the PDCP layer.

The system 400 comprises a first network node or gNB 402 (labelled as gNB a), two or more second network nodes or gNBs 404 (labelled as gNB b to gNB n), and a wireless device or UE 406. Control signals enter the network architecture at the top of the figure, into the first network node 402. The application control signal data ends up in a PDCP queue 402a, where a data multiplier creates multiple instances of each data item. One instance (e.g., one duplicate copy) of each data item is then sent to each RLC queue of a plurality of RLC queues 404a, acting as a transmission buffer. The RLC queues 404a are depicted as being implemented in different second gNBs 404. However, this is not a physical necessity, as those skilled in the art will appreciate that one or more of the base stations gNb b to gNb n 404 may be logical gNbs and/or may form part of gNB a 402. Each RLC queue is managed by a scheduler 404b that schedules each application data item (control signals) for transmission over a separate wireless interface. The wireless interface in one embodiment is an NR wireless interface. However, it may also be a Long Term Evolution (LTE) or 4G interface, a WIFI interface, or any other suitable wireless radio interface. The control signal data of each wireless interface is received in the UE 406. Here one UE 406 is depicted but also several UE entities may cooperate in the reception of the data. The received data from the wireless interfaces are sent to a data processing algorithm 406a, which selects the data to be used to mitigate the round trip delay problems described above. The control signals are then sent to the plant, where they are applied for feedback control purposes.

One objective of the data processing algorithm performed in the receiving node (UE) 406 is to reduce the (positive) variation of the round trip delay experienced by the feedback control application. The algorithm operates by selection of, or combination of, a subset of the received identical application control signal data items, each of these being valid for a certain time, and each of them being transmitted over a separate independent data path. The algorithm is described by means of examples below. However, alternative examples than those listed may be implemented, and the scope of this disclosure is not limited thereto. The round trip delay associated with use of the i:th received data item is denoted by $t_i$.

Use of First Received Application Control Signal Data Item

In one embodiment, for each position in the data stream, the algorithm uses the first received application control signal data item, i.e. the duplicate copy data item which is received before any other data items for that particular position. This embodiment corresponds to the use of the minimum of the round trip times, i.e.

$$RTT = \min_i(t_i).$$

Use of Middle Received Application Control Signal Data Item

In this embodiment, for each position in the data stream, the algorithm uses the received application control signal data item that (approximately) corresponds to the median of the round trip times for all duplicate copies of a particular data item, i.e.

$$RTT = \text{median}_i(t_i)$$

Use of the Kith Received Application Control Signal Data Item

In this embodiment, for each position in the data stream, the algorithm uses the received application control signal data item that corresponds to the kth received duplicate copy for all received duplicate copies of a particular data item (or all duplicate copies received within a particular time frame, e.g., before the delay budget for the data item expires). This means that the algorithm achieves $$Rtt = t_K.$$

The embodiments disclosed herein also provide for the signaling of configuration information, according to which the wireless receiving node (the UE, in the present example) may be configured with the algorithm to be used for the selection of duplicate copies for reconstruction of the data. Such configuration may be transmitted (e.g., by one of the one or more wireless transmitting nodes, or base stations in the present example) via Radio Resource Control (RRC)

signaling or L1/L2 signaling, for example. The configuration information may be transmitted in one or more information elements, carrying indications of one or more of the following:

UE identity

The total number of data paths configured

Which algorithm to use, including the number k when the algorithm comprises selecting the kth received duplicate copy.

Embodiments of the disclosure also provide duplication path aware scheduling and link adaptation.

In general, the packet error rate requirement (PER) at the application layer has a relation with the HARQ operating point (BLER target, a) and the total number of duplication transmissions (N) as shown in the equation below, assuming zero packet error loss in the core network (CN) and transport network (TN):

$$\alpha^N = PER$$

where

PER is the packet error rate specified in QoS requirement of a specific service/application.

$\alpha$ is the link adaptation HARQ operating point (BLER target) of the first data transmission.

N is the total number of independent duplication transmissions that are supported by the packet delay budget (PDB) of the service (e.g., as specified in the QoS requirements). And, $$N = N_{sim} + N_{time}$$

The duplicate copies can be in the time domain ($N_{time}$) including retransmissions/repetitions in different protocol layers for example HARQ retransmission, RLC retransmission, or other layers. Alternatively or additionally, the duplicate transmission can be simultaneous transmissions ($N_{sim}$) in a different resource domain such as frequency (e.g. carrier aggregation), and/or in different data paths (Dual connectivity with PDCP layer split), or/and in spatial domain (multi-antenna transmission/reception points in physical layer) which does not use combined reception or joint transmission.

For the time domain duplication, the total time taken to deliver the packet to the application layer, including retransmission/repetitions and duplicate transmission in different layers, should be within the service PDB. For an extremely high reliability and low latency service (for example PDB=1 ms, PER=1e$^{-6}$), retransmissions/repetitions over time may not be possible, with single path transmission (N=1), since the link adaptation operating point (BLER target, $\alpha$) is required to be equal to the PER requirement $\alpha$=1e$^{-6}$. To obtain accurate performance at this extremely low HARQ operating point, extremely high computational complexity is required and sufficient statistics for the existing link adaptation algorithm to converge in time becomes excessive.

Therefore, for a service with extremely high reliability and low latency requirement where retransmission is not possible, according to an embodiment of the disclosure, the number of simultaneous duplicate transmission paths are introduced into the scheduling and link adaptation algorithm, and the HARQ operating point (BLER target) is determined based on the equation below:

$$\alpha = f(\log PER/N_{sim})$$

$\alpha$ is BLER target of link adaptation of the individual data transmission path.

$N_{sim}$: the number of simultaneous transmission data paths, such as PDCP data duplication via dual- or multi-connectivity, and/or MAC layer data duplication transmission via Carrier Aggregation, and/or spatial duplicate transmissions via different physical transmission points.

With the proposed solution, for an extremely high reliability and low latency service (PER=1e$^{-6}$, PDB=1 ms), where retransmissions/repetitions are not possible, assuming simultaneous transmission paths $N_{sim}$=3, the BLER target of the individual link adaptation are set equal to $\alpha$=log 1e(−6/3)=1%.

To illustrate the performance gains of the methods proposed above, a nine data path delay skew control simulation was performed. A target round trip time of 1 ms was selected for the simulation.

Figure 3:
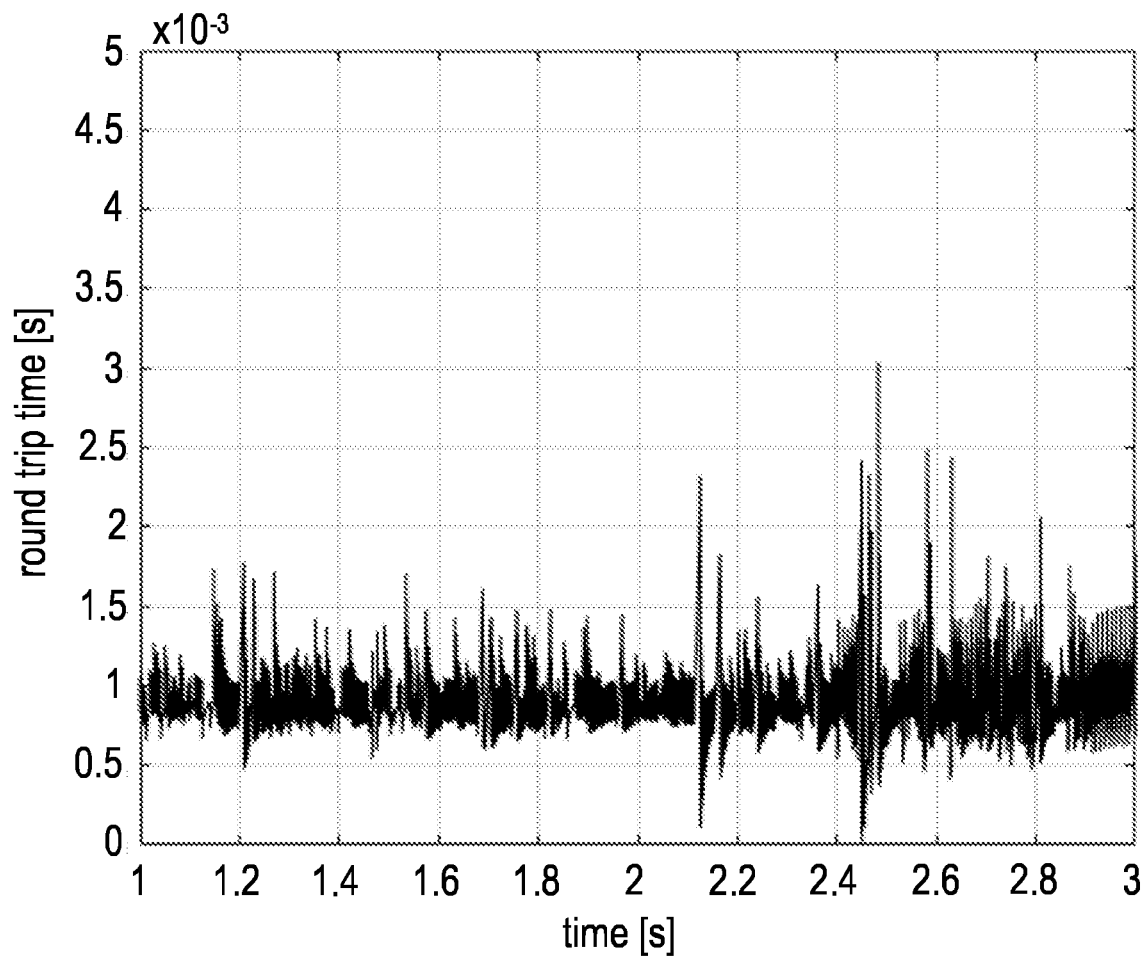
FIG. 3 shows typical remaining delay variation after downlink delay skew control.
Figure 5:
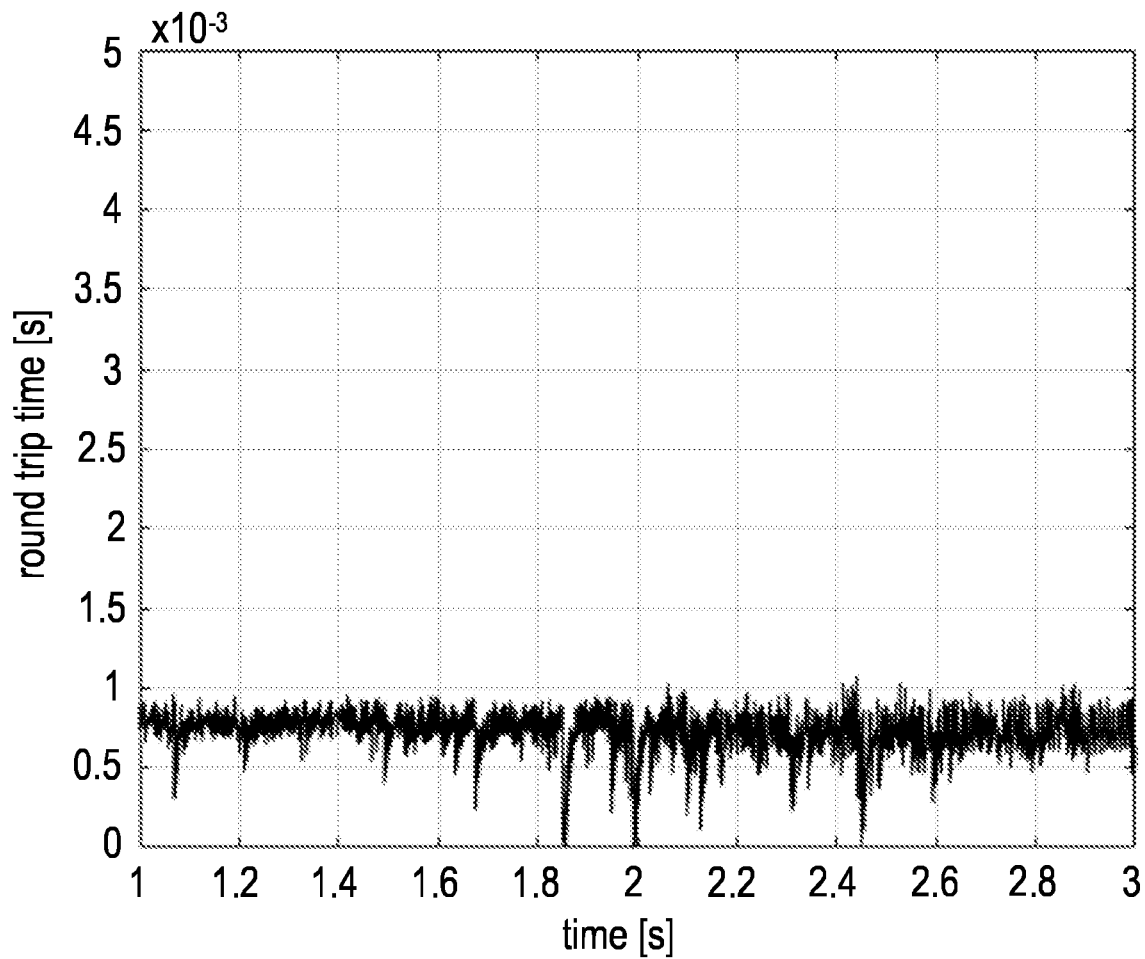
FIG. 5 shows a simulation of round trip time achieved by embodiments of the disclosure in which the first-received duplicate copy is selected.
Figure 6:
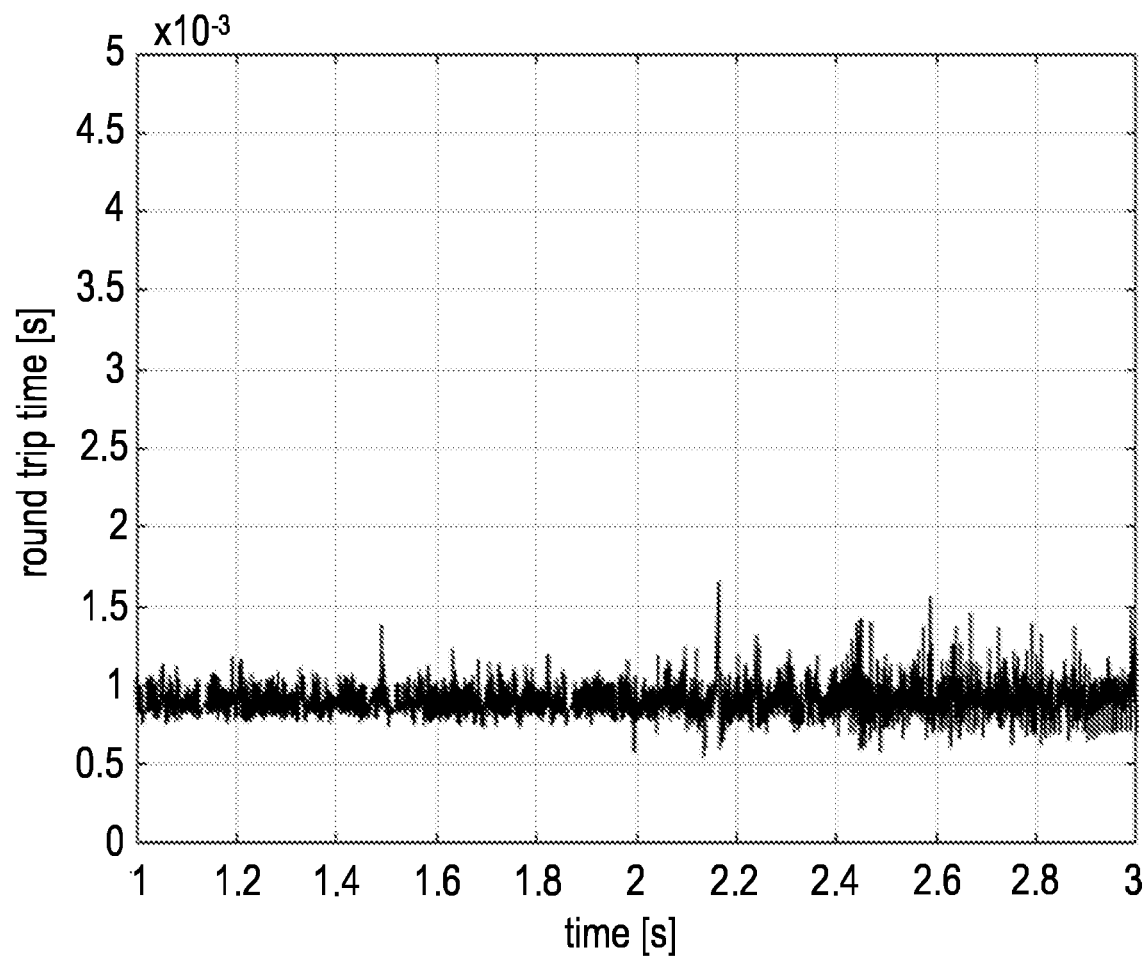
FIG. 6 shows a simulation of round trip time achieved by embodiments of the disclosure in which the median-received duplicate copy is selected.

The first data path of that simulation (i.e. without utilizing multiple duplicate copies) achieved a single data path round trip time performance indicated by FIG. 3 above. The round trip time performance of the data processing algorithm selecting the first-received duplicate copy is shown in FIG. 5, and that of the data processing algorithm selecting the median-received duplicate copy is shown in FIG. 6.

It is noted that both algorithms improve the situation radically. In particular the minimum based data processing algorithm meets 1 ms for all samples within a 5% error margin. The median based data processing algorithm is not as good, but stays below 1.5 ms within a 5% margin, which reduces the back off needed from a factor of 3 to a factor of 1.5. The median based algorithm also has an average round trip delay closer to 1 ms than the minimum algorithm.

In summary, both schemes significantly mitigate the problems identified above. The minimum based algorithm does so almost perfectly.

Figure 7:
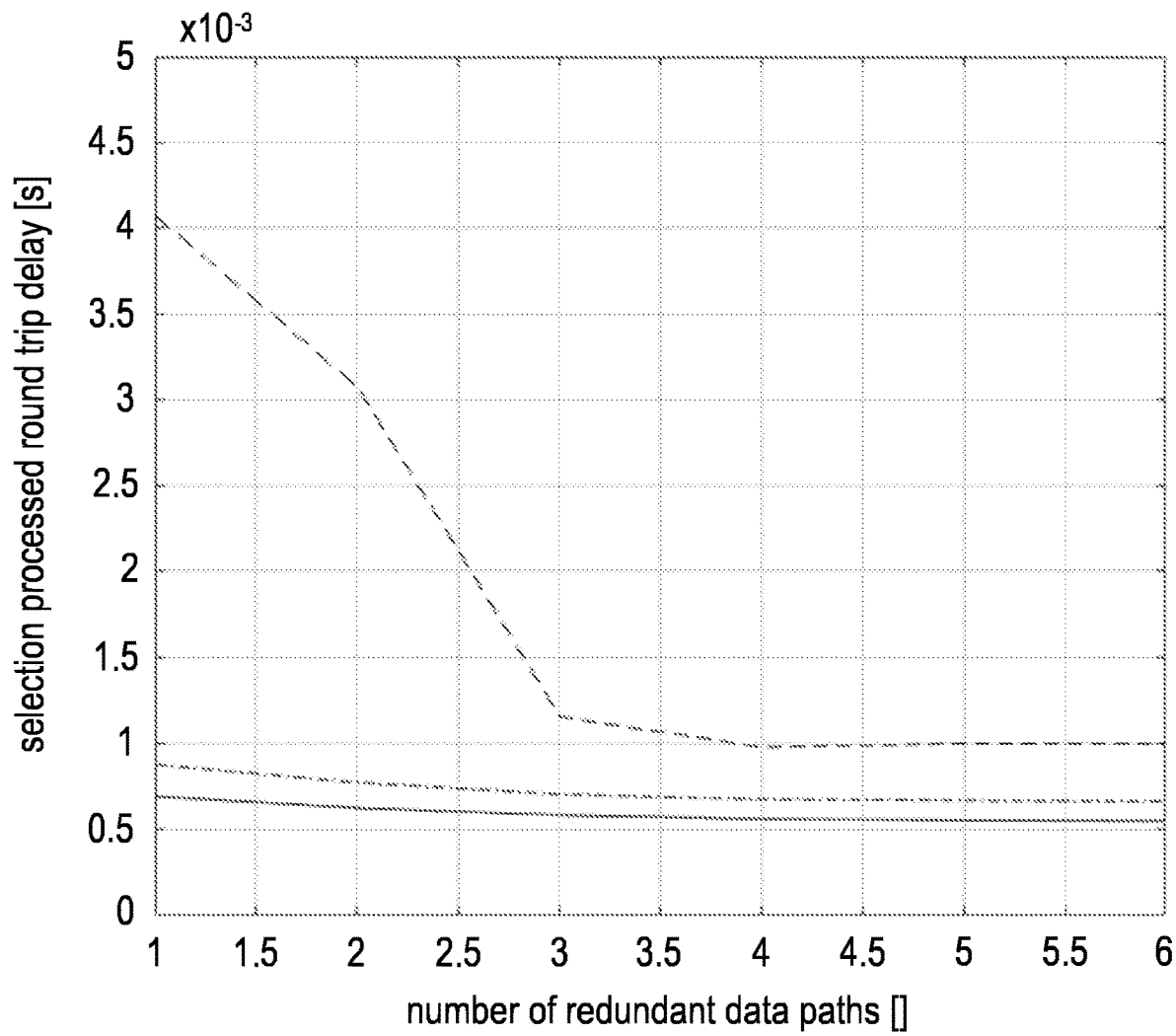
FIG. 7 shows a simulation of performance achieved by embodiments of the disclosure in which the first-received duplicate copy is selected, as a function of the number of data paths.

In order to study how many independent data paths should be used, new simulations with much longer duration and with a slightly lower setpoint were performed for 2, 3, 4, 5 and 6 data paths, based on the algorithm selecting the first-received duplicate copy. The results are shown in FIG. 7. Mean values are shown in a solid line; mean values with one standard deviation added are shown in the dashed-dotted line; and the mean values with maximum positive deviation are shown in the dashed line. According to these results, further reductions in the delay are relatively low when using more than three data paths. However, the maximum error for the simulated algorithm tends to occur for negative errors, and thus these results could be misleading. What can be seen is that three, or certainly four data paths should be sufficient to meet the extremely low delay requirements of the system. Further, it can be noted that the gain as compared to using a single data path is very significant.

UE Processing—gNB MAC Split

Figure 8:
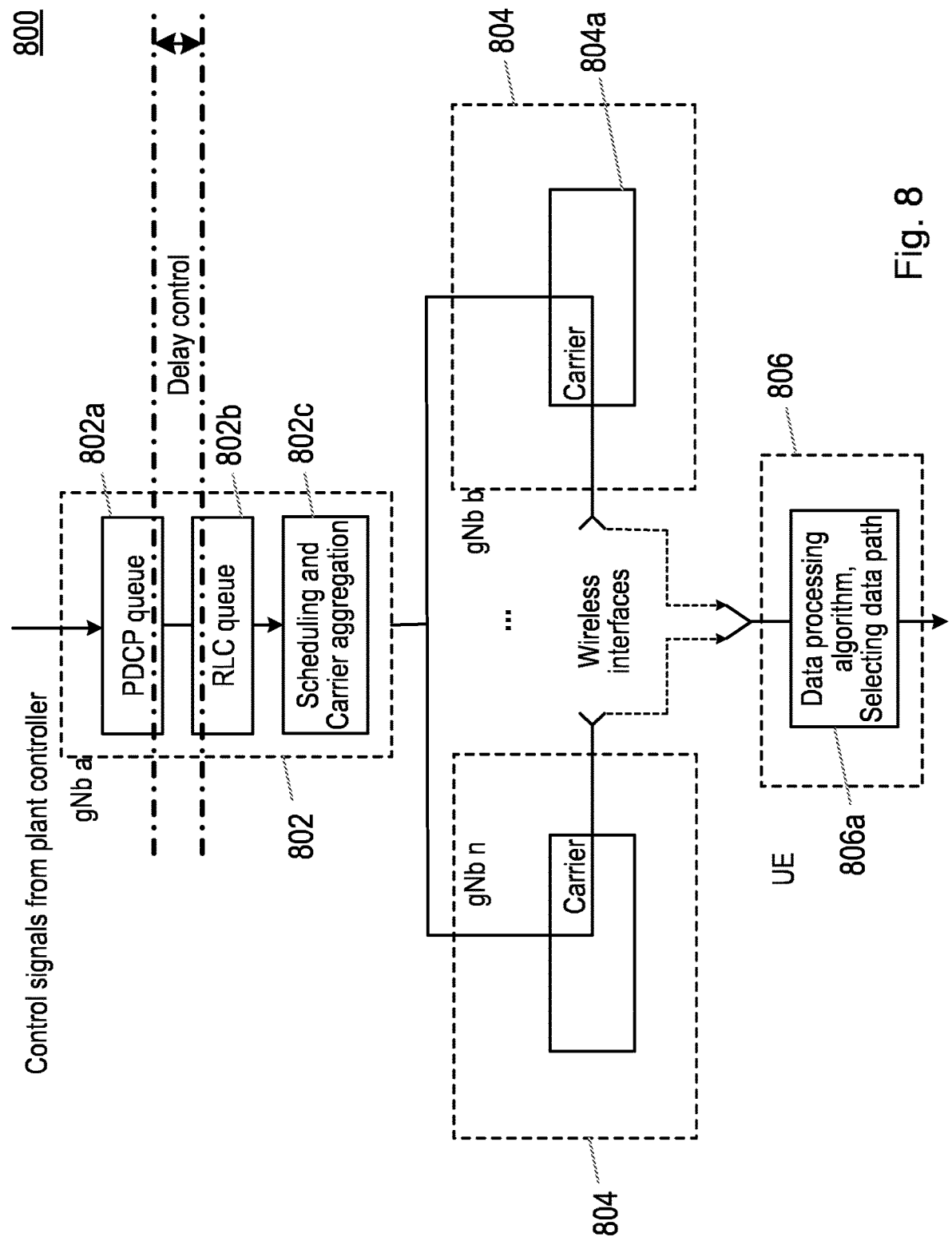
FIGS. 8 to 10 show systems according to further embodiments of the disclosure.

FIG. 8 shows the architecture of a system 800 according to further embodiments of the disclosure, in which downlink data is split at the MAC layer.

The system 800 comprises a first network node or gNB 802 (labelled as gNB a), two or more second network nodes or gNBs 804 (labelled as gNB b to gNB n), and a wireless device or UE 806. Control signals enter the architecture at the top of the figure, into the first radio access node 802, labelled gNb a. The application control signal data ends up in a PDCP queue 802a, from which it is fed to a RLC queue 802b, acting as a transmission buffer. A scheduler 802c distributes and replicates the data so that the same control signal data is sent via different carriers. Carrier queues 804a are depicted as being implemented in different gNBs 804. However, as with FIG. 4, this is not a physical necessity, and again those skilled in the art will appreciate that one or more of the gNBs 804 may be logical nodes, and/or combined with gNBa 802.

Other aspects of this example are similar to those described above with respect to FIG. 4.

gNb Processing—gNB PDCP Split

Figure 9:
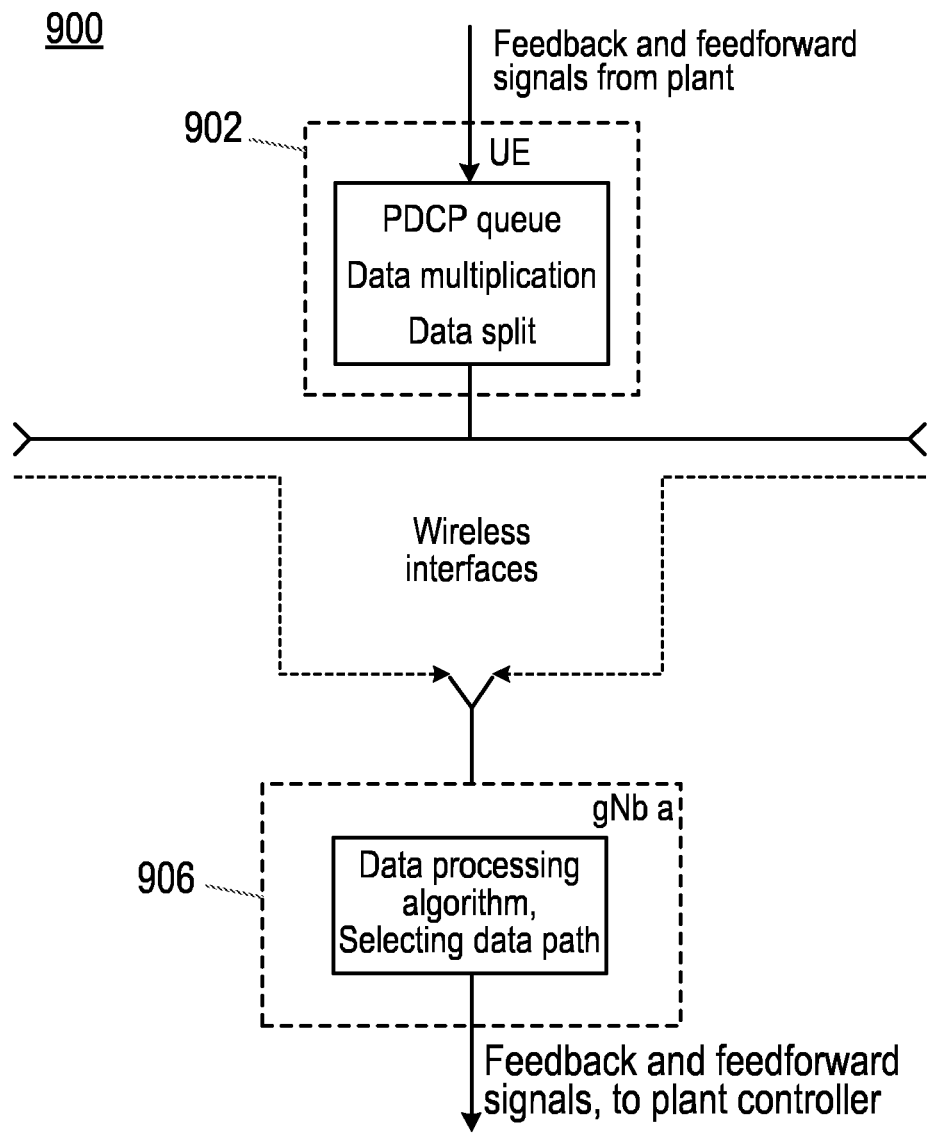

FIG. 9 shows the architecture of a system 900 according to further embodiments of the disclosure, in which uplink data is split at the PDCP layer.

The architecture is similar to the system 400 described above, with the difference that the application control data arriving to the UE 902 for transmission consists of feedback and feedforward signals. In addition, the UE 902 performs data duplication and manages the transmission over the wireless interfaces. At the receiving end, the gNb 906 executes the data processing algorithms, typically in association with the PDCP layer. Another difference is that no uplink delay and delay aligning control is used.

Other aspects of this example are similar to those described above with respect to FIG. 4.

gNb Processing—gNb MAC Split

Figure 10:
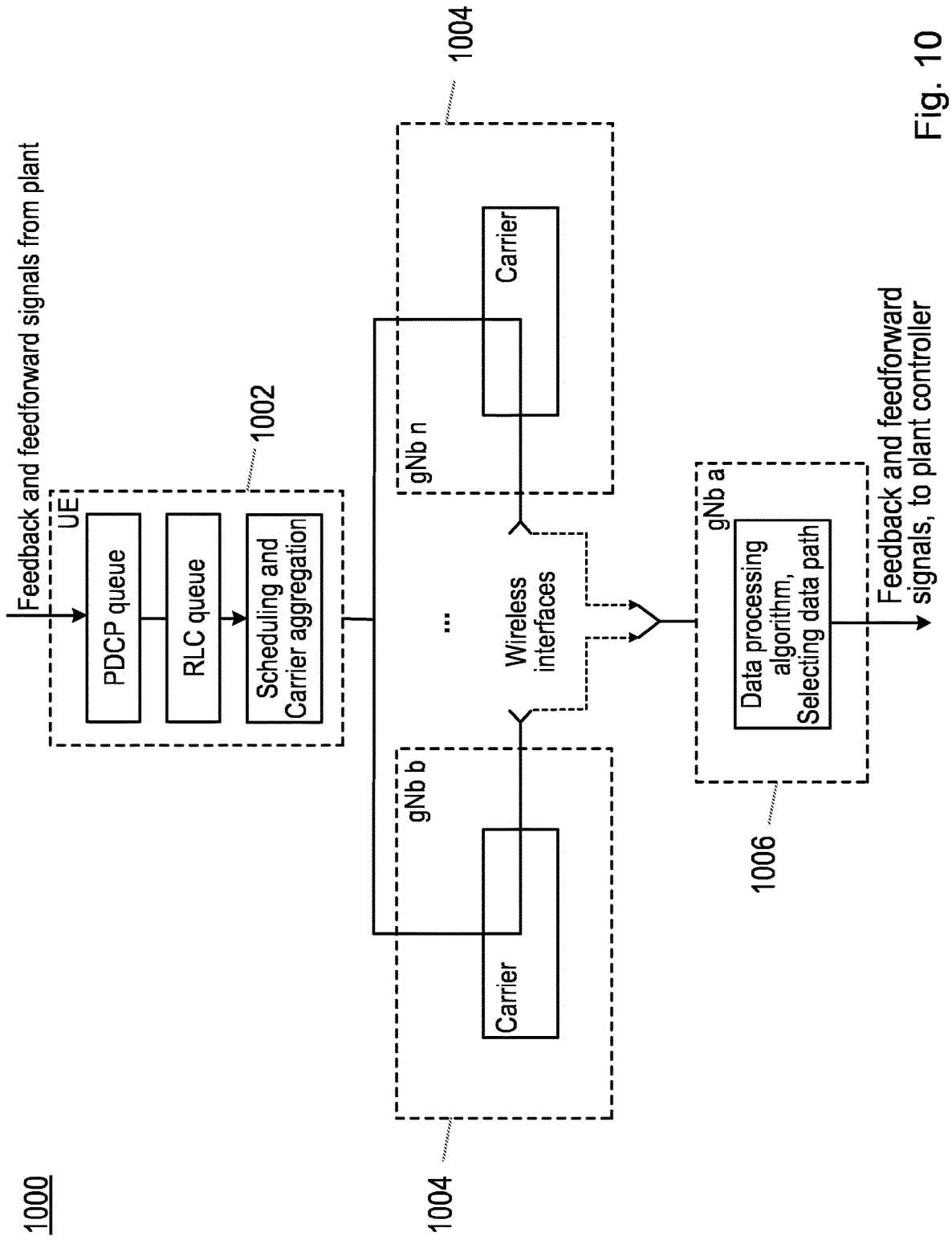

FIG. 10 shows the architecture of a system 1000 according to further embodiments of the disclosure, in which uplink data is split at the MAC layer.

The architecture is similar to that described above with respect to FIG. 8, with a difference that the application control data arriving to the UE 1002 for transmission consists of feedback and feedforward signals. In addition, the UE 1002 performs the split and manages the transmission over the wireless interfaces. At the receiving end, the gNb 1006 executes the data processing algorithms, typically in association with the PDCP layer. Another difference is that no uplink delay and delay aligning control is used.

Figure 11:
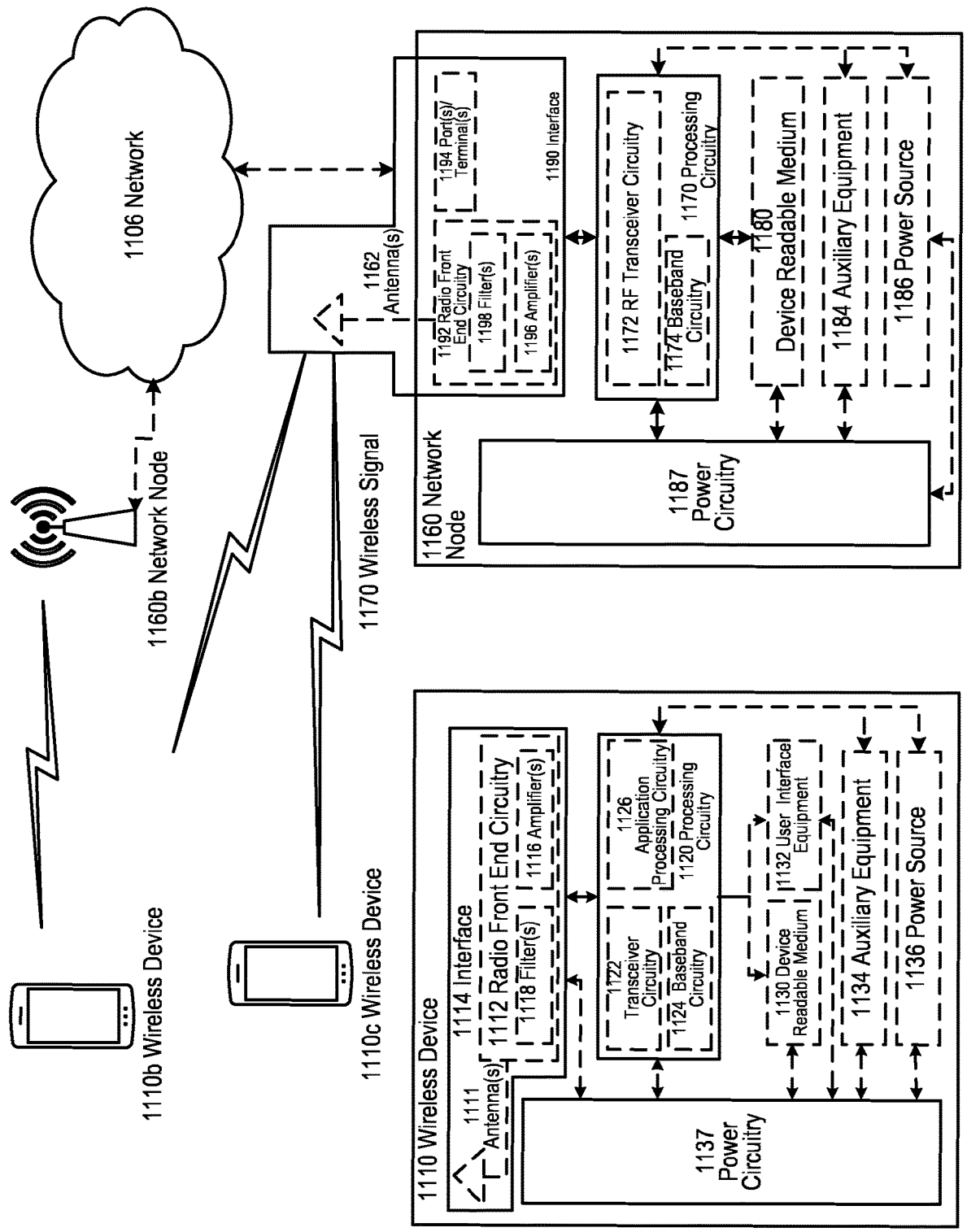
FIG. 11 is a schematic diagram illustrating a wireless network according to some embodiments.

Although the subject matter described herein may be implemented in any appropriate type of system using any suitable components, the embodiments disclosed herein are described in relation to a wireless network, such as the example wireless network illustrated in FIG. 11. For simplicity, the wireless network of FIG. 11 only depicts network 1106, network nodes 1160 and 1160*b*, and WDs 1110, 1110*b*, and 1110*c*. In practice, a wireless network may further include any additional elements suitable to support communication between wireless devices or between a wireless device and another communication device, such as a landline telephone, a service provider, or any other network node or end device. Of the illustrated components, network node 1160 and wireless device (WD) 1110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1160 and WD 1110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 11, network node 1160 includes processing circuitry 1170, device readable medium 1180, interface 1190, auxiliary equipment 1184, power source 1186, power circuitry 1187, and antenna 1162. Although network node 1160 illustrated in the example wireless network of FIG. 11 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1160 are depicted as single boxes located within a larger box, or nested within multiple boxes, in practice, a network node may comprise multiple different physical components that make up a single illustrated component (e.g., device readable medium 1180 may comprise multiple separate hard drives as well as multiple RAM modules).

Similarly, network node 1160 may be composed of multiple physically separate components (e.g., a NodeB component and a RNC component, or a BTS component and a BSC component, etc.), which may each have their own respective components. In certain scenarios in which network node 1160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 1160 may be configured to support multiple radio access technologies (RATs). In such embodiments, some components may be duplicated (e.g., separate device readable medium 1180 for the different RATs) and some components may be reused (e.g., the same antenna 1162 may be shared by the RATs). Network node 1160 may also include multiple sets of the various illustrated components for different wireless technologies integrated into network node 1160, such as, for example, GSM, WCDMA, LTE, NR, WiFi, or Bluetooth wireless technologies. These wireless technologies may be integrated into the same or different chip or set of chips and other components within network node 1160.

Processing circuitry 1170 is configured to perform any determining, calculating, or similar operations (e.g., certain obtaining operations) described herein as being provided by a network node. These operations performed by processing circuitry 1170 may include processing information obtained by processing circuitry 1170 by, for example, converting the obtained information into other information, comparing the obtained information or converted information to information stored in the network node, and/or performing one or more operations based on the obtained information or converted information, and as a result of said processing making a determination.

Processing circuitry 1170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1160 components, such as device readable medium 1180, network node 1160 functionality. For example, processing circuitry 1170 may execute instructions stored in device readable medium 1180 or in memory within processing circuitry 1170. Such functionality may include providing any of the various wireless features, functions, or benefits discussed herein. In some embodiments, processing circuitry 1170 may include a system on a chip (SOC).

In some embodiments, processing circuitry 1170 may include one or more of radio frequency (RF) transceiver circuitry 1172 and baseband processing circuitry 1174. In some embodiments, radio frequency (RF) transceiver circuitry 1172 and baseband processing circuitry 1174 may be on separate chips (or sets of chips), boards, or units, such as radio units and digital units. In alternative embodiments, part or all of RF transceiver circuitry 1172 and baseband processing circuitry 1174 may be on the same chip or set of chips, boards, or units In certain embodiments, some or all of the functionality described herein as being provided by a network node, base station, eNB or other such network device may be performed by processing circuitry 1170 executing instructions stored on device readable medium 1180 or memory within processing circuitry 1170. In alternative embodiments, some or all of the functionality may be provided by processing circuitry 1170 without executing instructions stored on a separate or discrete device readable medium, such as in a hard-wired manner. In any of those embodiments, whether executing instructions stored on a device readable storage medium or not, processing circuitry 1170 can be configured to perform the described functionality. The benefits provided by such functionality are not limited to processing circuitry 1170 alone or to other components of network node 1160, but are enjoyed by network node 1160 as a whole, and/or by end users and the wireless network generally.

Device readable medium 1180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1170. Device readable medium 1180 may store any suitable instructions, data or information, including a computer program, software, an application including one or more of logic, rules, code, tables, etc. and/or other instructions capable of being executed by processing circuitry 1170 and, utilized by network node 1160. Device readable medium 1180 may be used to store any calculations made by processing circuitry 1170 and/or any data received via interface 1190. In some embodiments, processing circuitry 1170 and device readable medium 1180 may be considered to be integrated.

Interface 1190 is used in the wired or wireless communication of signalling and/or data between network node 1160, network 1106, and/or WDs 1110. As illustrated, interface 1190 comprises port(s)/terminal(s) 1194 to send and receive data, for example to and from network 1106 over a wired connection. Interface 1190 also includes radio front end circuitry 1192 that may be coupled to, or in certain embodiments a part of, antenna 1162. Radio front end circuitry 1192 comprises filters 1198 and amplifiers 1196. Radio front end circuitry 1192 may be connected to antenna 1162 and processing circuitry 1170. Radio front end circuitry may be configured to condition signals communicated between antenna 1162 and processing circuitry 1170. Radio front end circuitry 1192 may receive digital data that is to be sent out to other network nodes or WDs via a wireless connection. Radio front end circuitry 1192 may convert the digital data into a radio signal having the appropriate channel and bandwidth parameters using a combination of filters 1198 and/or amplifiers 1196. The radio signal may then be transmitted via antenna 1162. Similarly, when receiving data, antenna 1162 may collect radio signals which are then converted into digital data by radio front end circuitry 1192. The digital data may be passed to processing circuitry 1170.

In other embodiments, the interface may comprise different components and/or different combinations of components.

In certain alternative embodiments, network node 1160 may not include separate radio front end circuitry 1192, instead, processing circuitry 1170 may comprise radio front end circuitry and may be connected to antenna 1162 without separate radio front end circuitry 1192. Similarly, in some embodiments, all or some of RF transceiver circuitry 1172 may be considered a part of interface 1190. In still other embodiments, interface 1190 may include one or more ports or terminals 1194, radio front end circuitry 1192, and RF transceiver circuitry 1172, as part of a radio unit (not shown), and interface 1190 may communicate with baseband processing circuitry 1174, which is part of a digital unit (not shown).

Antenna 1162 may include one or more antennas, or antenna arrays, configured to send and/or receive wireless signals. Antenna 1162 may be coupled to radio front end circuitry 1190 and may be any type of antenna capable of transmitting and receiving data and/or signals wirelessly. In some embodiments, antenna 1162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1162 may be separate from network node 1160 and may be connectable to network node 1160 through an interface or port.

Antenna 1162, interface 1190, and/or processing circuitry 1170 may be configured to perform any receiving operations and/or certain obtaining operations described herein as being performed by a network node. Any information, data and/or signals may be received from a wireless device, another network node and/or any other network equipment. Similarly, antenna 1162, interface 1190, and/or processing circuitry 1170 may be configured to perform any transmitting operations described herein as being performed by a network node. Any information, data and/or signals may be transmitted to a wireless device, another network node and/or any other network equipment.

Power circuitry 1187 may comprise, or be coupled to, power management circuitry and is configured to supply the components of network node 1160 with power for performing the functionality described herein. Power circuitry 1187 may receive power from power source 1186. Power source 1186 and/or power circuitry 1187 may be configured to provide power to the various components of network node 1160 in a form suitable for the respective components (e.g., at a voltage and current level needed for each respective component). Power source 1186 may either be included in, or external to, power circuitry 1187 and/or network node 1160. For example, network node 1160 may be connectable to an external power source (e.g., an electricity outlet) via an input circuitry or interface such as an electrical cable, whereby the external power source supplies power to power circuitry 1187. As a further example, power source 1186 may comprise a source of power in the form of a battery or battery pack which is connected to, or integrated in, power circuitry 1187. The battery may provide backup power should the external power source fail. Other types of power sources, such as photovoltaic devices, may also be used.

Alternative embodiments of network node 1160 may include additional components beyond those shown in FIG. 11 that may be responsible for providing certain aspects of the network node's functionality, including any of the functionality described herein and/or any functionality necessary to support the subject matter described herein. For example, network node 1160 may include user interface equipment to allow input of information into network node 1160 and to allow output of information from network node 1160. This may allow a user to perform diagnostic, maintenance, repair, and other administrative functions for network node 1160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1110 includes antenna 1111, interface 1114, processing circuitry 1120, device readable medium 1130, user interface equipment 1132, auxiliary equipment 1134, power source 1136 and power circuitry 1137. WD 1110 may include multiple sets of one or more of the illustrated components for different wireless technologies supported by WD 1110, such as, for example, GSM, WCDMA, LTE, NR, WiFi, WiMAX, or Bluetooth wireless technologies, just to mention a few. These wireless technologies may be integrated into the same or different chips or set of chips as other components within WD 1110.

Antenna 1111 may include one or more antennas or antenna arrays, configured to send and/or receive wireless signals, and is connected to interface 1114. In certain alternative embodiments, antenna 1111 may be separate from WD 1110 and be connectable to WD 1110 through an interface or port. Antenna 1111, interface 1114, and/or processing circuitry 1120 may be configured to perform any receiving or transmitting operations described herein as being performed by a WD. Any information, data and/or signals may be received from a network node and/or another WD. In some embodiments, radio front end circuitry and/or antenna 1111 may be considered an interface.

As illustrated, interface 1114 comprises radio front end circuitry 1112 and antenna 1111. Radio front end circuitry 1112 comprise one or more filters 1118 and amplifiers 1116. Radio front end circuitry 1114 is connected to antenna 1111 and processing circuitry 1120, and is configured to condition signals communicated between antenna 1111 and processing circuitry 1120. Radio front end circuitry 1112 may be coupled to or a part of antenna 1111. In some embodiments, WD 1110 may not include separate radio front end circuitry 1112; rather, processing circuitry 1120 may comprise radio front end circuitry and may be connected to antenna 1111. Similarly, in some embodiments, some or all of RF transceiver circuitry 1122 may be considered a part of interface 1114. Radio front end circuitry 1112 may receive digital data that is to be sent out to other network nodes or WDs via a wireless connection. Radio front end circuitry 1112 may convert the digital data into a radio signal having the appropriate channel and bandwidth parameters using a combination of filters 1118 and/or amplifiers 1116. The radio signal may then be transmitted via antenna 1111. Similarly, when receiving data, antenna 1111 may collect radio signals which are then converted into digital data by radio front end circuitry 1112. The digital data may be passed to processing circuitry 1120. In other embodiments, the interface may comprise different components and/or different combinations of components.

Processing circuitry 1120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1110 components, such as device readable medium 1130, WD 1110 functionality. Such functionality may include providing any of the various wireless features or benefits discussed herein. For example, processing circuitry 1120 may execute instructions stored in device readable medium 1130 or in memory within processing circuitry 1120 to provide the functionality disclosed herein.

As illustrated, processing circuitry 1120 includes one or more of RF transceiver circuitry 1122, baseband processing circuitry 1124, and application processing circuitry 1126. In other embodiments, the processing circuitry may comprise different components and/or different combinations of components. In certain embodiments processing circuitry 1120 of WD 1110 may comprise a SOC. In some embodiments, RF transceiver circuitry 1122, baseband processing circuitry 1124, and application processing circuitry 1126 may be on separate chips or sets of chips. In alternative embodiments, part or all of baseband processing circuitry 1124 and application processing circuitry 1126 may be combined into one chip or set of chips, and RF transceiver circuitry 1122 may be on a separate chip or set of chips. In still alternative embodiments, part or all of RF transceiver circuitry 1122 and baseband processing circuitry 1124 may be on the same chip or set of chips, and application processing circuitry 1126 may be on a separate chip or set of chips. In yet other alternative embodiments, part or all of RF transceiver circuitry 1122, baseband processing circuitry 1124, and application processing circuitry 1126 may be combined in the same chip or set of chips. In some embodiments, RF transceiver circuitry 1122 may be a part of interface 1114. RF transceiver circuitry 1122 may condition RF signals for processing circuitry 1120.

In certain embodiments, some or all of the functionality described herein as being performed by a WD may be provided by processing circuitry 1120 executing instructions stored on device readable medium 1130, which in certain embodiments may be a computer-readable storage medium. In alternative embodiments, some or all of the functionality may be provided by processing circuitry 1120 without executing instructions stored on a separate or discrete device readable storage medium, such as in a hard-wired manner. In any of those particular embodiments, whether executing instructions stored on a device readable storage medium or not, processing circuitry 1120 can be configured to perform the described functionality. The benefits provided by such functionality are not limited to processing circuitry 1120 alone or to other components of WD 1110, but are enjoyed by WD 1110 as a whole, and/or by end users and the wireless network generally.

Processing circuitry 1120 may be configured to perform any determining, calculating, or similar operations (e.g., certain obtaining operations) described herein as being performed by a WD. These operations, as performed by processing circuitry 1120, may include processing information obtained by processing circuitry 1120 by, for example, converting the obtained information into other information, comparing the obtained information or converted information to information stored by WD 1110, and/or performing one or more operations based on the obtained information or converted information, and as a result of said processing making a determination.

Device readable medium 1130 may be operable to store a computer program, software, an application including one or more of logic, rules, code, tables, etc. and/or other instructions capable of being executed by processing circuitry 1120. Device readable medium 1130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1120. In some embodiments, processing circuitry 1120 and device readable medium 1130 may be considered to be integrated.

User interface equipment 1132 may provide components that allow for a human user to interact with WD 1110. Such interaction may be of many forms, such as visual, audial, tactile, etc. User interface equipment 1132 may be operable to produce output to the user and to allow the user to provide input to WD 1110. The type of interaction may vary depending on the type of user interface equipment 1132 installed in WD 1110. For example, if WD 1110 is a smart phone, the interaction may be via a touch screen; if WD 1110 is a smart meter, the interaction may be through a screen that provides usage (e.g., the number of gallons used) or a speaker that provides an audible alert (e.g., if smoke is detected). User interface equipment 1132 may include input interfaces, devices and circuits, and output interfaces, devices and circuits. User interface equipment 1132 is configured to allow input of information into WD 1110, and is connected to processing circuitry 1120 to allow processing circuitry 1120 to process the input information. User interface equipment 1132 may include, for example, a microphone, a proximity or other sensor, keys/buttons, a touch display, one or more cameras, a USB port, or other input circuitry. User interface equipment 1132 is also configured to allow output of information from WD 1110, and to allow processing circuitry 1120 to output information from WD 1110. User interface equipment 1132 may include, for example, a speaker, a display, vibrating circuitry, a USB port, a headphone interface, or other output circuitry. Using one or more input and output interfaces, devices, and circuits, of user interface equipment 1132, WD 1110 may communicate with end users and/or the wireless network, and allow them to benefit from the functionality described herein.

Auxiliary equipment 1134 is operable to provide more specific functionality which may not be generally performed by WDs. This may comprise specialized sensors for doing measurements for various purposes, interfaces for additional types of communication such as wired communications etc. The inclusion and type of components of auxiliary equipment 1134 may vary depending on the embodiment and/or scenario.

Power source 1136 may, in some embodiments, be in the form of a battery or battery pack. Other types of power sources, such as an external power source (e.g., an electricity outlet), photovoltaic devices or power cells, may also be used. WD 1110 may further comprise power circuitry 1137 for delivering power from power source 1136 to the various parts of WD 1110 which need power from power source 1136 to carry out any functionality described or indicated herein. Power circuitry 1137 may in certain embodiments comprise power management circuitry. Power circuitry 1137 may additionally or alternatively be operable to receive power from an external power source; in which case WD 1110 may be connectable to the external power source (such as an electricity outlet) via input circuitry or an interface such as an electrical power cable. Power circuitry 1137 may also in certain embodiments be operable to deliver power from an external power source to power source 1136. This may be, for example, for the charging of power source 1136. Power circuitry 1137 may perform any formatting, converting, or other modification to the power from power source 1136 to make the power suitable for the respective components of WD 1110 to which power is supplied.

Figure 12:
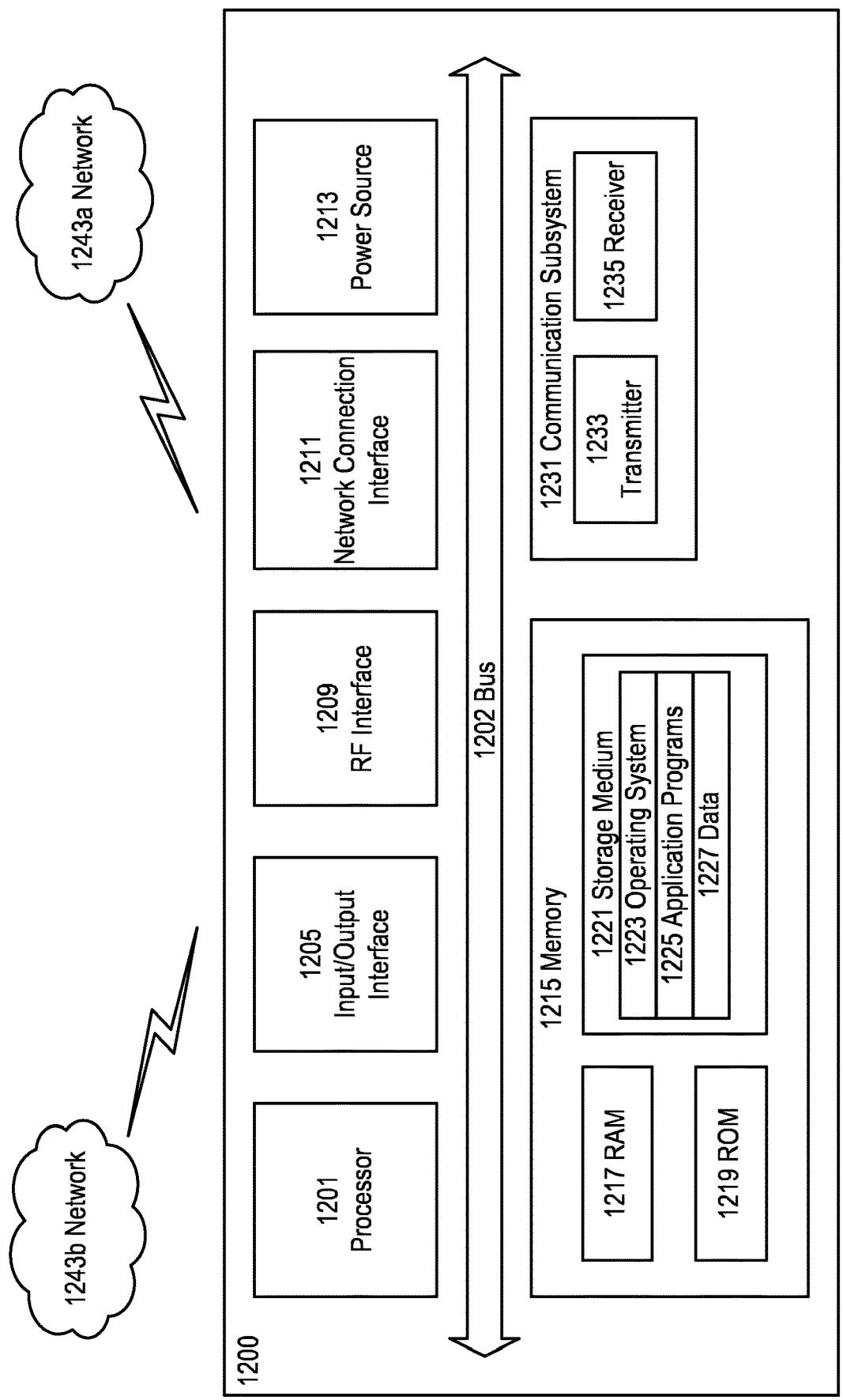
FIG. 12 is a schematic diagram illustrating a user equipment according to some embodiments.

FIG. 12 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 1200 may be any UE identified by the $3^{rd}$ Generation Partnership Project (3GPP), including a NB-IoT UE, a machine type communication (MTC) UE, and/or an enhanced MTC (eMTC) UE. UE 1200, as illustrated in FIG. 12, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 12 is a UE, the components discussed herein are equally applicable to a WD, and vice-versa.

In FIG. 12, UE 1200 includes processing circuitry 1201 that is operatively coupled to input/output interface 1205, radio frequency (RF) interface 1209, network connection interface 1211, memory 1215 including random access memory (RAM) 1217, read-only memory (ROM) 1219, and storage medium 1221 or the like, communication subsystem 1231, power source 1233, and/or any other component, or any combination thereof. Storage medium 1221 includes operating system 1223, application program 1225, and data 1227. In other embodiments, storage medium 1221 may include other similar types of information. Certain UEs may utilize all of the components shown in FIG. 12, or only a subset of the components. The level of integration between the components may vary from one UE to another UE. Further, certain UEs may contain multiple instances of a component, such as multiple processors, memories, transceivers, transmitters, receivers, etc.

In FIG. 12, processing circuitry 1201 may be configured to process computer instructions and data. Processing circuitry 1201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1201 may include two central processing units (CPUs). Data may be information in a form suitable for use by a computer.

In the depicted embodiment, input/output interface 1205 may be configured to provide a communication interface to an input device, output device, or input and output device. UE 1200 may be configured to use an output device via input/output interface 1205. An output device may use the same type of interface port as an input device. For example, a USB port may be used to provide input to and output from UE 1200. The output device may be a speaker, a sound card, a video card, a display, a monitor, a printer, an actuator, an emitter, a smartcard, another output device, or any combination thereof. UE 1200 may be configured to use an input device via input/output interface 1205 to allow a user to capture information into UE 1200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 12, RF interface 1209 may be configured to provide a communication interface to RF components such as a transmitter, a receiver, and an antenna. Network connection interface 1211 may be configured to provide a communication interface to network 1243a. Network 1243a may encompass wired and/or wireless networks such as a local-area network (LAN), a wide-area network (WAN), a computer network, a wireless network, a telecommunications network, another like network or any combination thereof. For example, network 1243a may comprise a Wi-Fi network. Network connection interface 1211 may be configured to include a receiver and a transmitter interface used to communicate with one or more other devices over a communication network according to one or more communication protocols, such as Ethernet, TCP/IP, SONET, ATM, or the like. Network connection interface 1211 may implement receiver and transmitter functionality appropriate to the communication network links (e.g., optical, electrical, and the like). The transmitter and receiver functions may share circuit components, software or firmware, or alternatively may be implemented separately.

RAM 1217 may be configured to interface via bus 1202 to processing circuitry 1201 to provide storage or caching of data or computer instructions during the execution of software programs such as the operating system, application programs, and device drivers. ROM 1219 may be configured to provide computer instructions or data to processing circuitry 1201. For example, ROM 1219 may be configured to store invariant low-level system code or data for basic system functions such as basic input and output (I/O), startup, or reception of keystrokes from a keyboard that are stored in a non-volatile memory. Storage medium 1221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1221 may be configured to include operating system 1223, application program 1225 such as a web browser application, a widget or gadget engine or another application, and data file 1227. Storage medium 1221 may store, for use by UE 1200, any of a variety of various operating systems or combinations of operating systems.

Storage medium 1221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1221 may allow UE 1200 to access computer-executable instructions, application programs or the like, stored on transitory or non-transitory memory media, to off-load data, or to upload data. An article of manufacture, such as one utilizing a communication system may be tangibly embodied in storage medium 1221, which may comprise a device readable medium.

In FIG. 12, processing circuitry 1201 may be configured to communicate with network 1243b using communication subsystem 1231. Network 1243a and network 1243b may be the same network or networks or different network or networks. Communication subsystem 1231 may be configured to include one or more transceivers used to communicate with network 1243b. For example, communication subsystem 1231 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter 1233 and/or receiver 1235 to implement transmitter or receiver functionality, respectively, appropriate to the RAN links (e.g., frequency allocations and the like). Further, transmitter 1233 and receiver 1235 of each transceiver may share circuit components, software or firmware, or alternatively may be implemented separately.

In the illustrated embodiment, the communication functions of communication subsystem 1231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1231 may include cellular communication, Wi-Fi communication, Bluetooth communication, and GPS communication. Network 1243b may encompass wired and/or wireless networks such as a local-area network (LAN), a wide-area network (WAN), a computer network, a wireless network, a telecommunications network, another like network or any combination thereof. For example, network 1243b may be a cellular network, a Wi-Fi network, and/or a near-field network. Power source 1213 may be configured to provide alternating current (AC) or direct current (DC) power to components of UE 1200.

The features, benefits and/or functions described herein may be implemented in one of the components of UE 1200 or partitioned across multiple components of UE 1200. Further, the features, benefits, and/or functions described herein may be implemented in any combination of hardware, software or firmware. In one example, communication subsystem 1231 may be configured to include any of the components described herein. Further, processing circuitry 1201 may be configured to communicate with any of such components over bus 1202. In another example, any of such components may be represented by program instructions stored in memory that when executed by processing circuitry 1201 perform the corresponding functions described herein. In another example, the functionality of any of such components may be partitioned between processing circuitry 1201 and communication subsystem 1231. In another example, the non-computationally intensive functions of any of such components may be implemented in software or firmware and the computationally intensive functions may be implemented in hardware.

Figure 13:
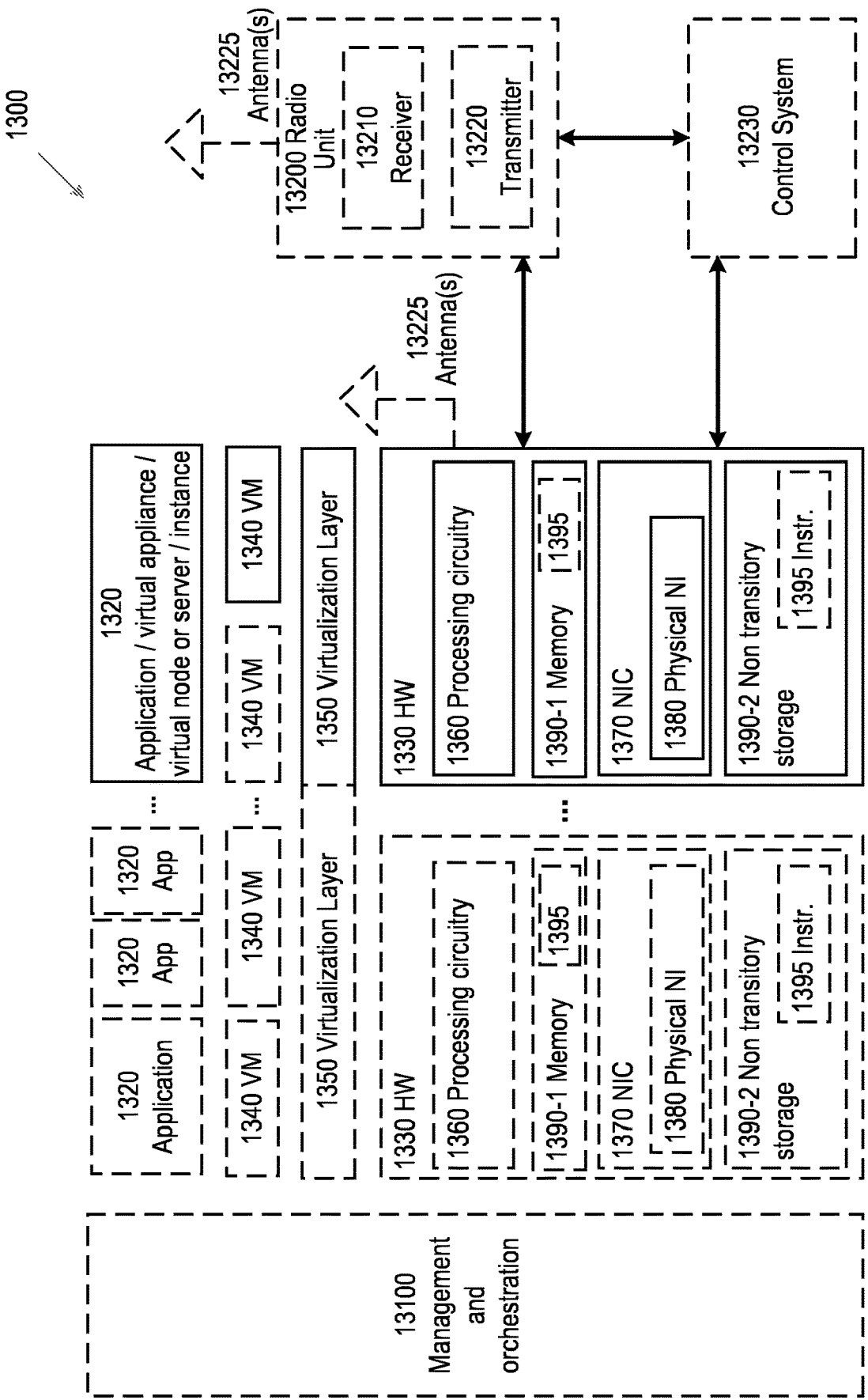
FIG. 13 is a schematic block diagram illustrating a virtualization environment according to some embodiments.

FIG. 13 is a schematic block diagram illustrating a virtualization environment 1300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1300 hosted by one or more of hardware nodes 1330. Further, in embodiments in which the virtual node is not a radio access node or does not require radio connectivity (e.g., a core network node), then the network node may be entirely virtualized.

The functions may be implemented by one or more applications 1320 (which may alternatively be called software instances, virtual appliances, network functions, virtual nodes, virtual network functions, etc.) operative to implement some of the features, functions, and/or benefits of some of the embodiments disclosed herein. Applications 1320 are run in virtualization environment 1300 which provides hardware 1330 comprising processing circuitry 1360 and memory 1390. Memory 1390 contains instructions 1395 executable by processing circuitry 1360 whereby application 1320 is operative to provide one or more of the features, benefits, and/or functions disclosed herein.

Virtualization environment 1300, comprises general-purpose or special-purpose network hardware devices 1330 comprising a set of one or more processors or processing circuitry 1360, which may be commercial off-the-shelf (COTS) processors, dedicated Application Specific Integrated Circuits (ASICs), or any other type of processing circuitry including digital or analog hardware components or special purpose processors. Each hardware device may comprise memory 1390-1 which may be non-persistent memory for temporarily storing instructions 1395 or software executed by processing circuitry 1360. Each hardware device may comprise one or more network interface controllers (NICs) 1370, also known as network interface cards, which include physical network interface 1380. Each hardware device may also include non-transitory, persistent, machine-readable storage media 1390-2 having stored therein software 1395 and/or instructions executable by processing circuitry 1360. Software 1395 may include any type of software including software for instantiating one or more virtualization layers 1350 (also referred to as hypervisors), software to execute virtual machines 1340 as well as software allowing it to execute functions, features and/or benefits described in relation with some embodiments described herein.

Virtual machines 1340, comprise virtual processing, virtual memory, virtual networking or interface and virtual storage, and may be run by a corresponding virtualization layer 1350 or hypervisor. Different embodiments of the instance of virtual appliance 1320 may be implemented on one or more of virtual machines 1340, and the implementations may be made in different ways.

During operation, processing circuitry 1360 executes software 1395 to instantiate the hypervisor or virtualization layer 1350, which may sometimes be referred to as a virtual machine monitor (VMM). Virtualization layer 1350 may present a virtual operating platform that appears like networking hardware to virtual machine 1340.

As shown in FIG. 13, hardware 1330 may be a standalone network node with generic or specific components. Hardware 1330 may comprise antenna 13225 and may implement some functions via virtualization. Alternatively, hardware 1330 may be part of a larger cluster of hardware (e.g. such as in a data center or customer premise equipment (CPE)) where many hardware nodes work together and are managed via management and orchestration (MANO) 13100, which, among others, oversees lifecycle management of applications 1320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1340 may be a software implementation of a physical machine that runs programs as if they were executing on a physical, non-virtualized machine. Each of virtual machines 1340, and that part of hardware 1330 that executes that virtual machine, be it hardware dedicated to that virtual machine and/or hardware shared by that virtual machine with others of the virtual machines 1340, forms a separate virtual network elements (VNE).

Still in the context of NFV, Virtual Network Function (VNF) is responsible for handling specific network functions that run in one or more virtual machines 1340 on top of hardware networking infrastructure 1330 and corresponds to application 1320 in FIG. 13.

In some embodiments, one or more radio units 13200 that each include one or more transmitters 13220 and one or more receivers 13210 may be coupled to one or more antennas 13225. Radio units 13200 may communicate directly with hardware nodes 1330 via one or more appropriate network interfaces and may be used in combination with the virtual components to provide a virtual node with radio capabilities, such as a radio access node or a base station.

In some embodiments, some signalling can be effected with the use of control system 13230 which may alternatively be used for communication between the hardware nodes 1330 and radio units 13200.

Figure 14:
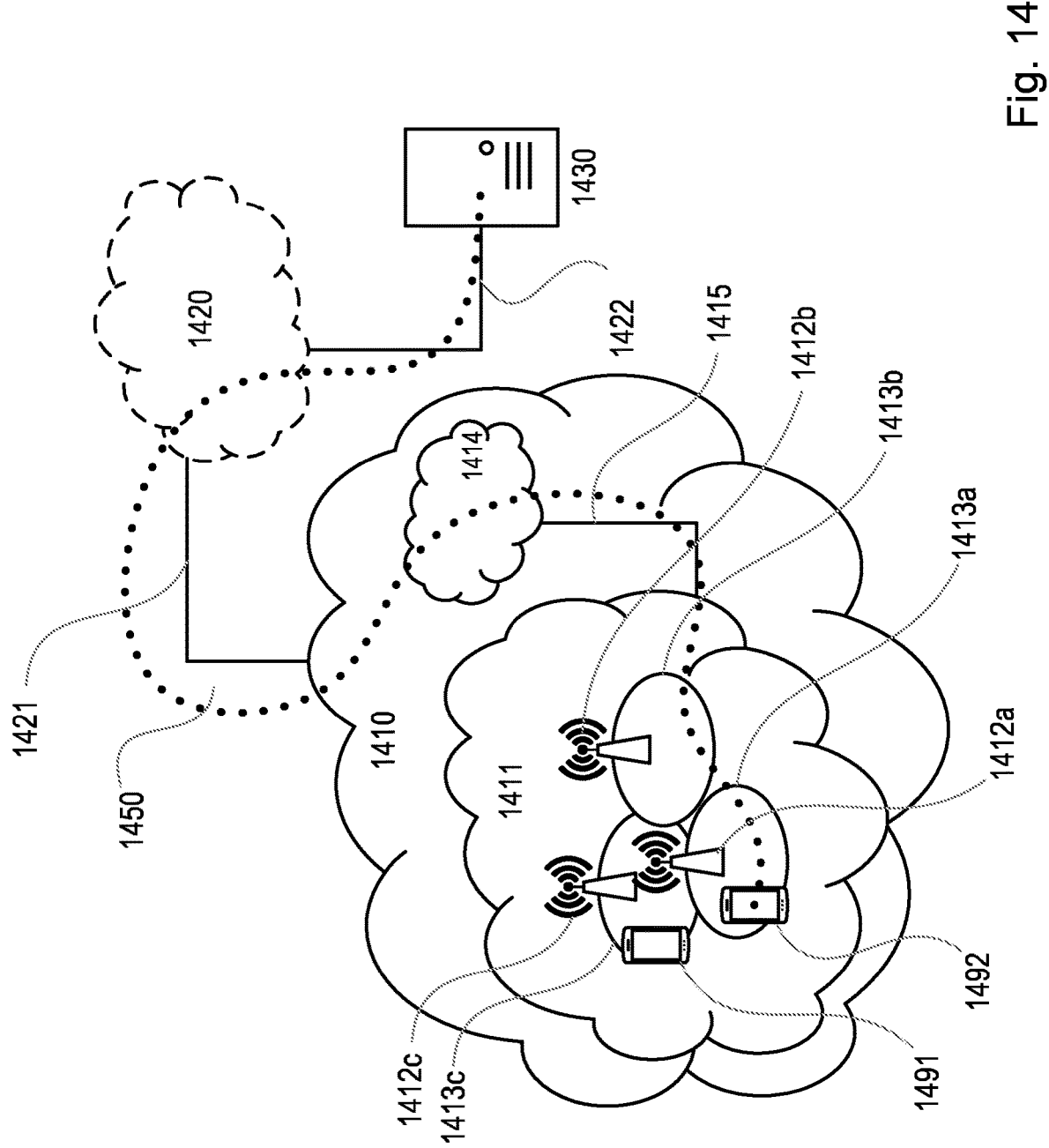
FIG. 14 shows a telecommunication network connected via an intermediate network to a host computer in accordance with some embodiments.

With reference to FIG. 14, in accordance with an embodiment, a communication system includes telecommunication network 1410, such as a 3GPP-type cellular network, which comprises access network 1411, such as a radio access network, and core network 1414. Access network 1411 comprises a plurality of base stations 1412a, 1412b, 1412c, such as NBs, eNBs, gNBs or other types of wireless access points, each defining a corresponding coverage area 1413a, 1413b, 1413c. Each base station 1412a, 1412b, 1412c is connectable to core network 1414 over a wired or wireless connection 1415. A first UE 1491 located in coverage area 1413c is configured to wirelessly connect to, or be paged by, the corresponding base station 1412c. A second UE 1492 in coverage area 1413a is wirelessly connectable to the corresponding base station 1412a. While a plurality of UEs 1491, 1492 are illustrated in this example, the disclosed embodiments are equally applicable to a situation where a sole UE is in the coverage area or where a sole UE is connecting to the corresponding base station 1412.

Telecommunication network 1410 is itself connected to host computer 1430, which may be embodied in the hardware and/or software of a standalone server, a cloud-implemented server, a distributed server or as processing resources in a server farm. Host computer 1430 may be under the ownership or control of a service provider, or may be operated by the service provider or on behalf of the service provider. Connections 1421 and 1422 between telecommunication network 1410 and host computer 1430 may extend directly from core network 1414 to host computer 1430 or may go via an optional intermediate network 1420. Intermediate network 1420 may be one of, or a combination of more than one of, a public, private or hosted network; intermediate network 1420, if any, may be a backbone network or the Internet; in particular, intermediate network 1420 may comprise two or more sub-networks (not shown).

The communication system of FIG. 14 as a whole enables connectivity between the connected UEs 1491, 1492 and host computer 1430. The connectivity may be described as an over-the-top (OTT) connection 1450. Host computer 1430 and the connected UEs 1491, 1492 are configured to communicate data and/or signaling via OTT connection 1450, using access network 1411, core network 1414, any intermediate network 1420 and possible further infrastructure (not shown) as intermediaries. OTT connection 1450 may be transparent in the sense that the participating communication devices through which OTT connection 1450 passes are unaware of routing of uplink and downlink communications. For example, base station 1412 may not or need not be informed about the past routing of an incoming downlink communication with data originating from host computer 1430 to be forwarded (e.g., handed over) to a connected UE 1491. Similarly, base station 1412 need not be aware of the future routing of an outgoing uplink communication originating from the UE 1491 towards the host computer 1430.

Example implementations, in accordance with an embodiment, of the UE, base station and host computer discussed in the preceding paragraphs will now be described with reference to FIG. 15. In communication system 1500, host computer 1510 comprises hardware 1515 including communication interface 1516 configured to set up and maintain a wired or wireless connection with an interface of a different communication device of communication system 1500. Host computer 1510 further comprises processing circuitry 1518, which may have storage and/or processing capabilities. In particular, processing circuitry 1518 may comprise one or more programmable processors, application-specific integrated circuits, field programmable gate arrays or combinations of these (not shown) adapted to execute instructions. Host computer 1510 further comprises software 1511, which is stored in or accessible by host computer 1510 and executable by processing circuitry 1518. Software 1511 includes host application 1512. Host application 1512 may be operable to provide a service to a remote user, such as UE 1530 connecting via OTT connection 1550 terminating at UE 1530 and host computer 1510. In providing the service to the remote user, host application 1512 may provide user data which is transmitted using OTT connection 1550.

Communication system 1500 further includes base station 1520 provided in a telecommunication system and comprising hardware 1525 enabling it to communicate with host computer 1510 and with UE 1530. Hardware 1525 may include communication interface 1526 for setting up and maintaining a wired or wireless connection with an interface of a different communication device of communication system 1500, as well as radio interface 1527 for setting up and maintaining at least wireless connection 1570 with UE 1530 located in a coverage area (not shown in FIG. 15) served by base station 1520. Communication interface 1526 may be configured to facilitate connection 1560 to host computer 1510. Connection 1560 may be direct or it may pass through a core network (not shown in FIG. 15) of the telecommunication system and/or through one or more intermediate networks outside the telecommunication system. In the embodiment shown, hardware 1525 of base station 1520 further includes processing circuitry 1528, which may comprise one or more programmable processors, application-specific integrated circuits, field programmable gate arrays or combinations of these (not shown) adapted to execute instructions. Base station 1520 further has software 1521 stored internally or accessible via an external connection.

Communication system 1500 further includes UE 1530 already referred to. Its hardware 1535 may include radio interface 1537 configured to set up and maintain wireless connection 1570 with a base station serving a coverage area in which UE 1530 is currently located. Hardware 1535 of UE 1530 further includes processing circuitry 1538, which may comprise one or more programmable processors, application-specific integrated circuits, field programmable gate arrays or combinations of these (not shown) adapted to execute instructions. UE 1530 further comprises software 1531, which is stored in or accessible by UE 1530 and executable by processing circuitry 1538. Software 1531 includes client application 1532. Client application 1532 may be operable to provide a service to a human or non-human user via UE 1530, with the support of host computer 1510. In host computer 1510, an executing host application 1512 may communicate with the executing client application 1532 via OTT connection 1550 terminating at UE 1530 and host computer 1510. In providing the service to the user, client application 1532 may receive request data from host application 1512 and provide user data in response to the request data. OTT connection 1550 may transfer both the request data and the user data. Client application 1532 may interact with the user to generate the user data that it provides.

Figure 15:
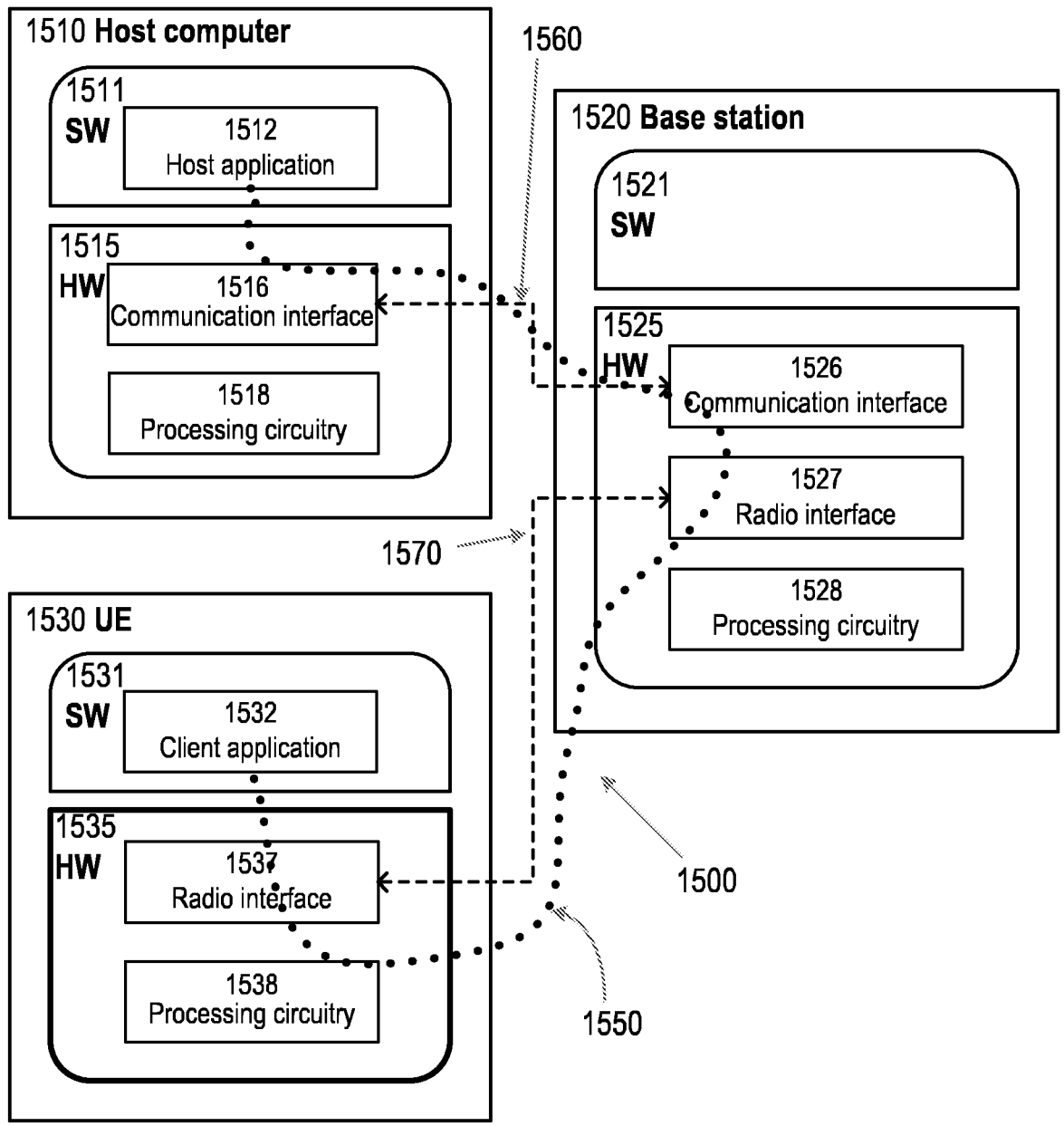
FIG. 15 shows a host computer communicating via a base station with a user equipment over a partially wireless connection in accordance with some embodiments

It is noted that host computer 1510, base station 1520 and UE 1530 illustrated in FIG. 15 may be similar or identical to host computer 1430, one of base stations 1412a, 1412b, 1412c and one of UEs 1491, 1492 of FIG. 14, respectively. This is to say, the inner workings of these entities may be as shown in FIG. 15 and independently, the surrounding network topology may be that of FIG. 14.

In FIG. 15, OTT connection 1550 has been drawn abstractly to illustrate the communication between host computer 1510 and UE 1530 via base station 1520, without explicit reference to any intermediary devices and the precise routing of messages via these devices. Network infrastructure may determine the routing, which it may be configured to hide from UE 1530 or from the service provider operating host computer 1510, or both. While OTT connection 1550 is active, the network infrastructure may further take decisions by which it dynamically changes the routing (e.g., on the basis of load balancing consideration or reconfiguration of the network).

Wireless connection 1570 between UE 1530 and base station 1520 is in accordance with the teachings of the embodiments described throughout this disclosure. One or more of the various embodiments improve the performance of OTT services provided to UE 1530 using OTT connection 1550, in which wireless connection 1570 forms the last segment. More precisely, the teachings of these embodiments may improve the latency and reliability of data transmissions, and thereby provide benefits such as reduced user waiting time and better responsiveness.

A measurement procedure may be provided for the purpose of monitoring data rate, latency and other factors on which the one or more embodiments improve. There may further be an optional network functionality for reconfiguring OTT connection 1550 between host computer 1510 and UE 1530, in response to variations in the measurement results. The measurement procedure and/or the network functionality for reconfiguring OTT connection 1550 may be implemented in software 1511 and hardware 1515 of host computer 1510 or in software 1531 and hardware 1535 of UE 1530, or both. In embodiments, sensors (not shown) may be deployed in or in association with communication devices through which OTT connection 1550 passes; the sensors may participate in the measurement procedure by supplying values of the monitored quantities exemplified above, or supplying values of other physical quantities from which software 1511, 1531 may compute or estimate the monitored quantities. The reconfiguring of OTT connection 1550 may include message format, retransmission settings, preferred routing etc.; the reconfiguring need not affect base station 1520, and it may be unknown or imperceptible to base station 1520. Such procedures and functionalities may be known and practiced in the art. In certain embodiments, measurements may involve proprietary UE signaling facilitating host computer 1510's measurements of throughput, propagation times, latency and the like. The measurements may be implemented in that software 1511 and 1531 causes messages to be transmitted, in particular empty or 'dummy' messages, using OTT connection 1550 while it monitors propagation times, errors etc.

Figure 16:
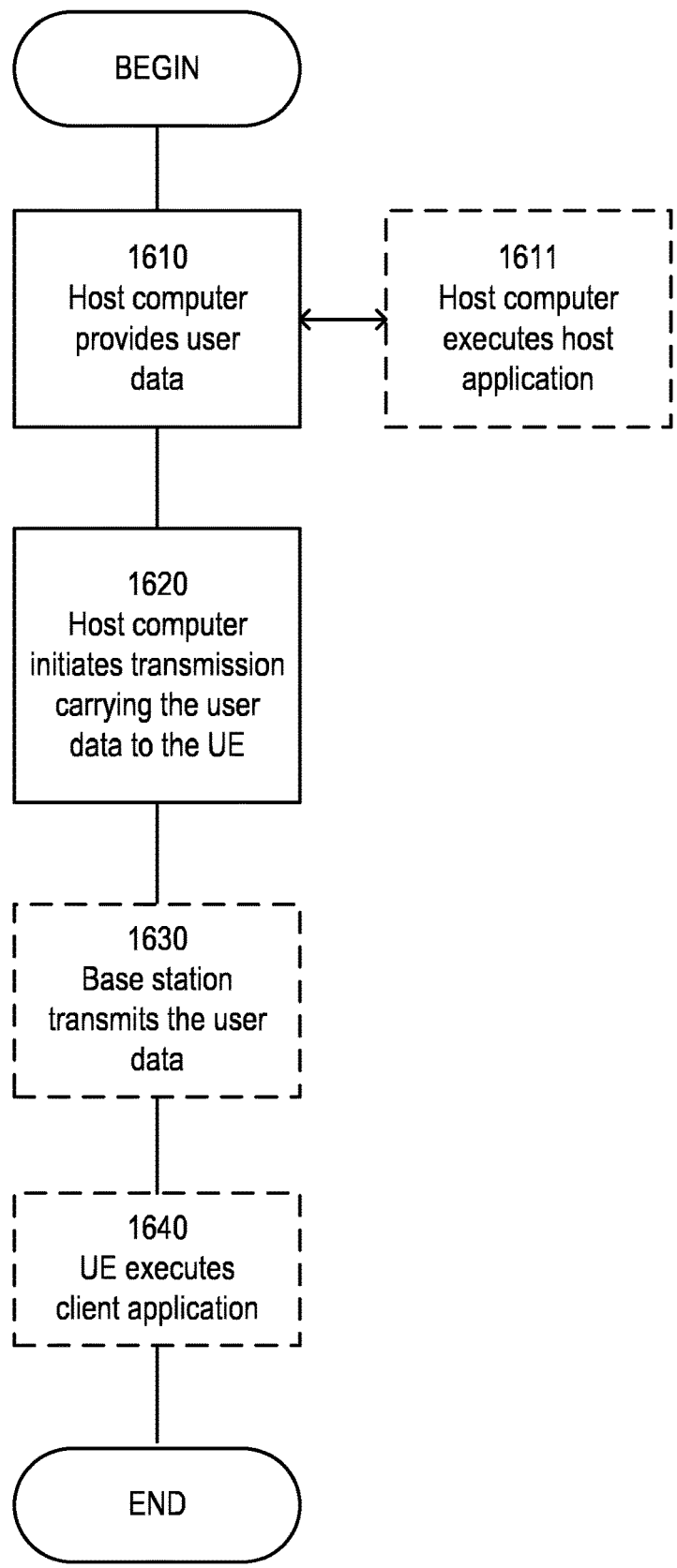
FIGS. 16 to 19 are flowcharts illustrating methods implemented in a communication system, in accordance with one embodiment.

FIG. 16 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 16 will be included in this section. In step 1610, the host computer provides user data. In substep 1611 (which may be optional) of step 1610, the host computer provides the user data by executing a host application. In step 1620, the host computer initiates a transmission carrying the user data to the UE. In step 1630 (which may be optional), the base station transmits to the UE the user data which was carried in the transmission that the host computer initiated, in accordance with the teachings of the embodiments described throughout this disclosure. In step 1640 (which may also be optional), the UE executes a client application associated with the host application executed by the host computer.

Figure 17:
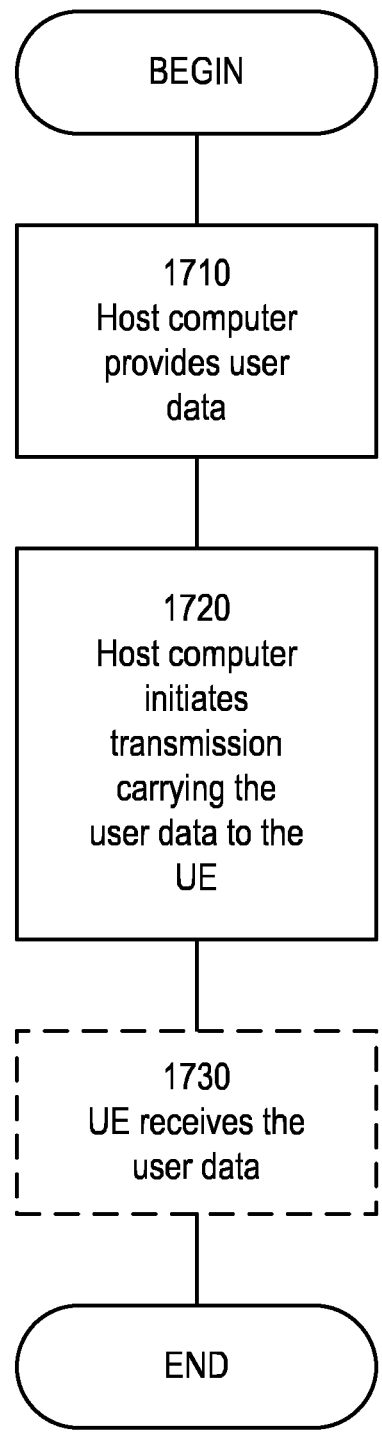

FIG. 17 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 17 will be included in this section. In step 1710 of the method, the host computer provides user data. In an optional substep (not shown) the host computer provides the user data by executing a host application. In step 1720, the host computer initiates a transmission carrying the user data to the UE. The transmission may pass via the base station, in accordance with the teachings of the embodiments described throughout this disclosure. In step 1730 (which may be optional), the UE receives the user data carried in the transmission.

Figure 18:
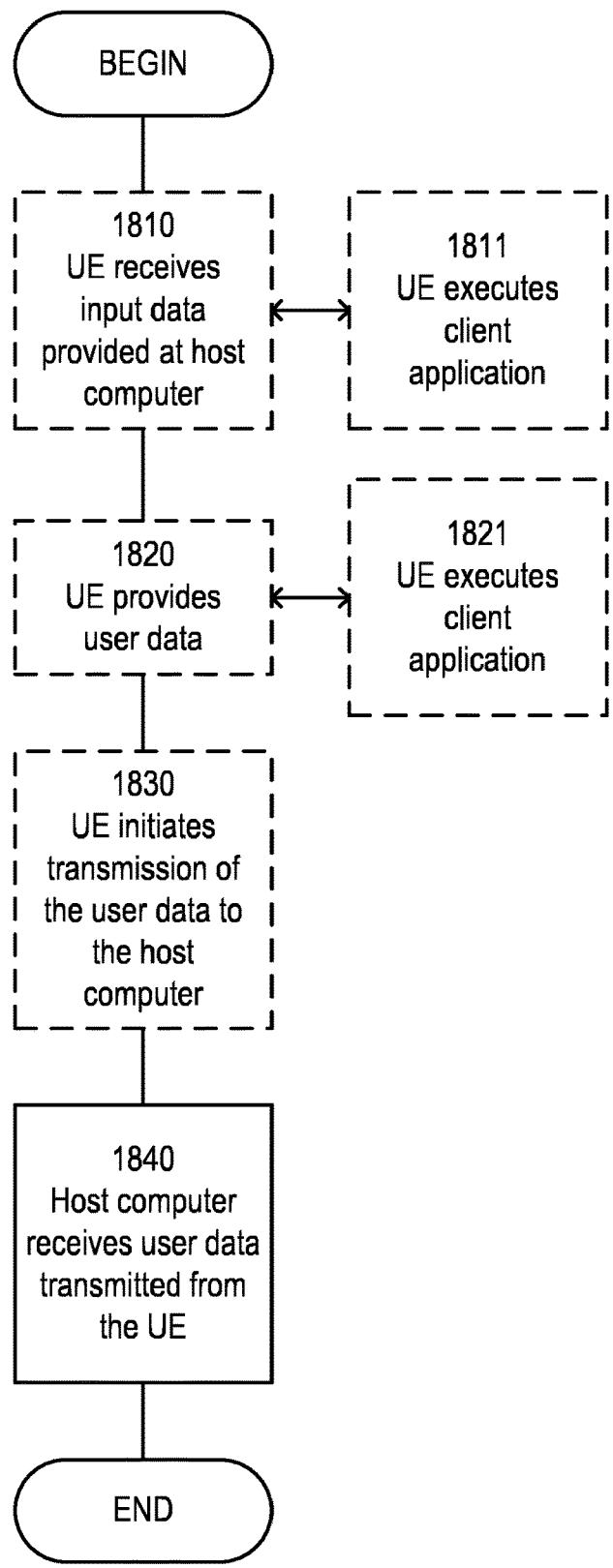

FIG. 18 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 18 will be included in this section. In step 1810 (which may be optional), the UE receives input data provided by the host computer. Additionally or alternatively, in step 1820, the UE provides user data. In substep 1821 (which may be optional) of step 1820, the UE provides the user data by executing a client application. In substep 1811 (which may be optional) of step 1810, the UE executes a client application which provides the user data in reaction to the received input data provided by the host computer. In providing the user data, the executed client application may further consider user input received from the user. Regardless of the specific manner in which the user data was provided, the UE initiates, in substep 1830 (which may be optional), transmission of the user data to the host computer. In step 1840 of the method, the host computer receives the user data transmitted from the UE, in accordance with the teachings of the embodiments described throughout this disclosure.

Figure 19:
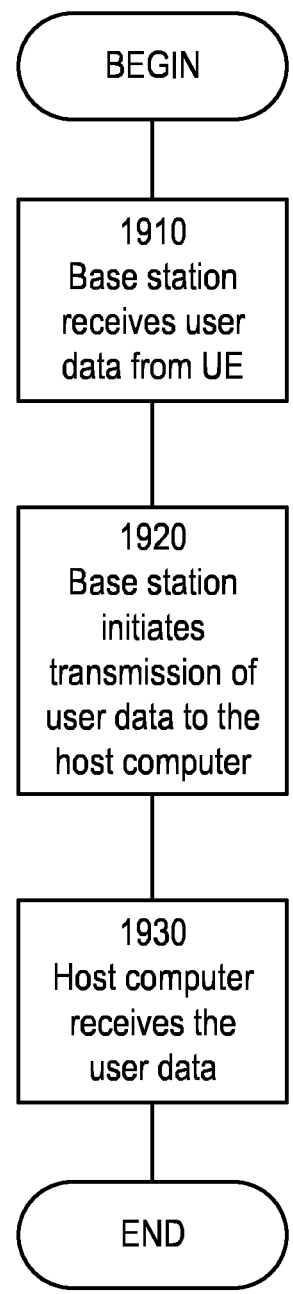

FIG. 19 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 19 will be included in this section. In step 1910 (which may be optional), in accordance with the teachings of the embodiments described throughout this disclosure, the base station receives user data from the UE. In step 1920 (which may be optional), the base station initiates transmission of the received user data to the host computer. In step 1930 (which may be optional), the host computer receives the user data carried in the transmission initiated by the base station.

Figure 20:
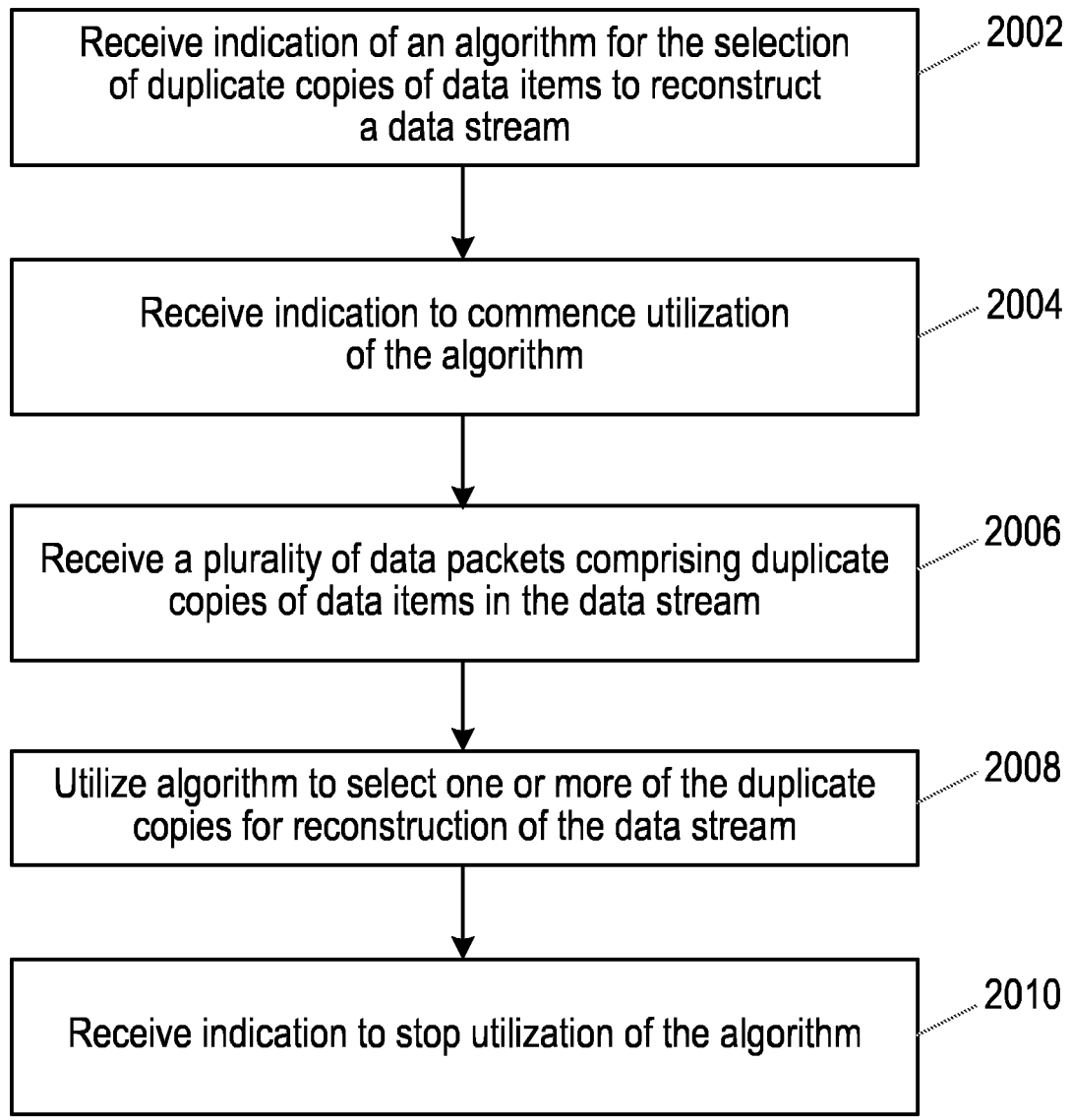
FIG. 20 depicts a method in accordance with particular embodiments of the disclosure.

FIG. 20 depicts a method in accordance with particular embodiments. The method may be performed by a wireless receiving node, such as a wireless device or UE operating in downlink, or a radio access network node operating in uplink. For example, the method may be performed by the wireless device 1110 or the UE 1200 described above operating in downlink, or the network node 1160 described above (e.g., a base station) operating in uplink. The method may be used to receive data having particularly strict reliability requirements and/or low-latency requirements. For example, the data may be ultra-reliable low-latency communication (URLLC) data or critical machine-type communication (C-MTC) data.

The method involves the transmission, by one or more wireless transmitting nodes, of multiple duplicate copies of data items belonging to the data to be received and reconstructed. The duplicate copies of the data items may be sent via different mechanisms, such as via different wireless interfaces (e.g., in which case multiple wireless transmitting nodes may transmit the duplicate copies), via different carriers configured with the same wireless transmitting node (e.g., at different frequencies), and via different spatial streams (e.g., transmitted by different transmission—reception points of the same network node or base station). Thus each data item which belongs to the data to be transmitted is duplicated at least once (and potentially more than once), to provide a plurality of copies which are transmitted via independent transmission mechanisms. The data items which are duplicated may be PDCP PDUs or MAC PDUs, for example. The wireless receiving node receives one or more of the transmitted duplicate copies and, for each data item, must select one or more of the duplicate copies to be used for reconstruction of the originally transmitted data.

The method begins at step 2002, in which the wireless receiving node receives an indication of an algorithm to be used for the selection of duplicate copies of data stems to reconstruct the data. The indication may be received from one or more of the one or more wireless transmitting nodes. For example, where the one or more wireless transmitting nodes are radio access network nodes operating in a multi-connectivity scheme, the indication of the algorithm may be received from a master or primary radio access network node such as a node providing the PCell or SpCell. The indication may be received via RRC or MAC signalling, for example. The indicated algorithm may be one of a plurality of possible algorithms. In this case, the indication may comprise an index settable to a plurality of values, each associated with a respective algorithm. The indication may be set to a value associated with the indicated algorithm. The association between index values and corresponding algorithms may be pre-configured in the wireless receiving node, e.g., via further signalling or programming of the node upon manufacture (e.g. for operation according to a particular wireless standard).

In step 2004, the wireless receiving node receives an indication to commence utilization of the algorithm. This indication may comprise an indication that data duplication is about to commence, with multiple duplicate copies of data items to be transmitted by the one or more wireless transmitting nodes. The indication may comprise an indication of the number of duplicate copies that are to be transmitted, and/or the location of the duplicate copies, e.g., the radio resources (e.g., which interface carrier, frequency, time, etc) on which the duplicate copies can be found. The indication in step 2004 may be contained with the same or a different message as the indication of the algorithm to be used, received in step 2002. In the former case, for example where only a single algorithm is implemented in the network, the indication received in step 2004 may implicitly indicate the algorithm that is to be used (i.e., the only algorithm that is implemented). Alternatively, the indication received in step 2002 may comprise an implicit instruction to commence utilization of the algorithm.

In step 2006, the wireless receiving node receives a plurality of data packets from the one or more wireless transmitting nodes. The data packets comprise the duplicate copies of the data items, as noted above. Also as described above, it will be understood by those skilled in the art that the data packets themselves may not be duplicates of each other, but rather comprise the duplicate copies of the data items. Thus the data packets may comprise other, different data and/or control signalling (e.g., control headers). The duplicate copies of the data items may be sent via different mechanisms, such as via different wireless interfaces (e.g., in which case multiple wireless transmitting nodes may transmit the duplicate copies), via different carriers configured with the same wireless transmitting node (e.g., at different frequencies), and via different spatial streams (e.g., transmitted by different transmission-reception points of the same network node or base station). It will further be appreciated that the plurality of data packets may be received via a plurality of receiver mechanisms, such as via a plurality of wireless devices (UEs).

In step 2008, the wireless receiving node utilizes the algorithm indicated in step 2002 to select, based on the respective times at which each of the plurality of data packets were received in step 2006, for each of the data items in the data to be reconstructed, one or more of the duplicate copies for reconstruction of the data. Various different algorithms may be utilized. For example, the algorithm may comprise the wireless receiving node selecting the kth received duplicate copy for reconstruction of the data, where k is an integer greater than or equal to one. The value of k may be specified in the indication received in step 2002. In a particular example, k is equal to one, in which case the wireless receiving node utilizes the first-received duplicate copy of each data item for reconstruction of the data. Alternatively, the algorithm may comprise the wireless receiving node selecting the median received duplicate copy for reconstruction of the data, when all received duplicate copies are ordered according to the respective times at which they were received. Once reconstructed, the data may be used in any suitable way. For example, where the data comprises control signals for machinery, those control signals may be forwarded to the machinery; where the data comprises feedback signals from machinery, those control signals may be forwarded to a controller for the machinery.

In step 2010, the wireless receiving node receives an indication or an instruction to stop or halt utilization of the algorithm. For example, the indication may comprise an indication that data duplication is to be ceased. Responsive to receipt of the indication, the wireless receiving node stops selecting duplicate copies for reconstruction of the data.

Figure 21:
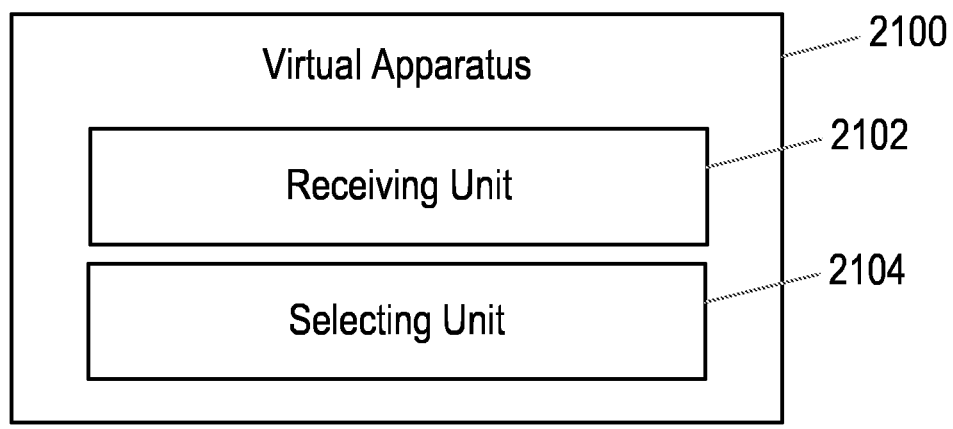
FIG. 21 illustrates a schematic block diagram of an apparatus in a wireless network.

FIG. 21 illustrates a schematic block diagram of an apparatus 2100 in a wireless network (for example, the wireless network shown in FIG. 11). The apparatus may be implemented in a wireless receiving node, such as a wireless device operating in downlink or a network node operating in uplink (e.g., wireless device 1110 or network node 1160 shown in FIG. 11). Apparatus 2100 is operable to carry out the example method described with reference to FIG. 20 and possibly any other processes or methods disclosed herein. It is also to be understood that the method of FIG. 20 is not necessarily carried out solely by apparatus 2100. At least some operations of the method can be performed by one or more other entities.

Virtual Apparatus 2100 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause receiving unit 2102 and selecting unit 2104, and any other suitable units of apparatus 2100 to perform corresponding functions according one or more embodiments of the present disclosure.

As illustrated in FIG. 21, apparatus 2100 includes receiving unit 2102 and selecting unit 2104. Receiving unit 2102 is configured to receive a plurality of data packets from one or more wireless transmitting nodes, each data packet comprising respective duplicate copies of data items belonging to a data stream. The data stream comprises a sequence of data items. Selecting unit 2104 is configured to utilize an algorithm to select, based on respective times at which the data packets are received, for each position in the sequence, one or more of the duplicate copies of data items for reconstruction of the data stream.

In particular embodiments of the disclosure, receiving unit 2102 may be configured to receive an indication of the algorithm from a wireless transmitting node of the one or more wireless transmitting nodes. For example, the indication may comprise an indication of an ordinal number of the duplicate copy to be selected for each position in the sequence, when the duplicate copies for each position are ordered according to the respective times at which the duplicate copies (e.g., the data packets comprising the duplicate copies) are received. For example, the indication may indicate that the duplicate copy which is first received should be selected.

Figure 22:
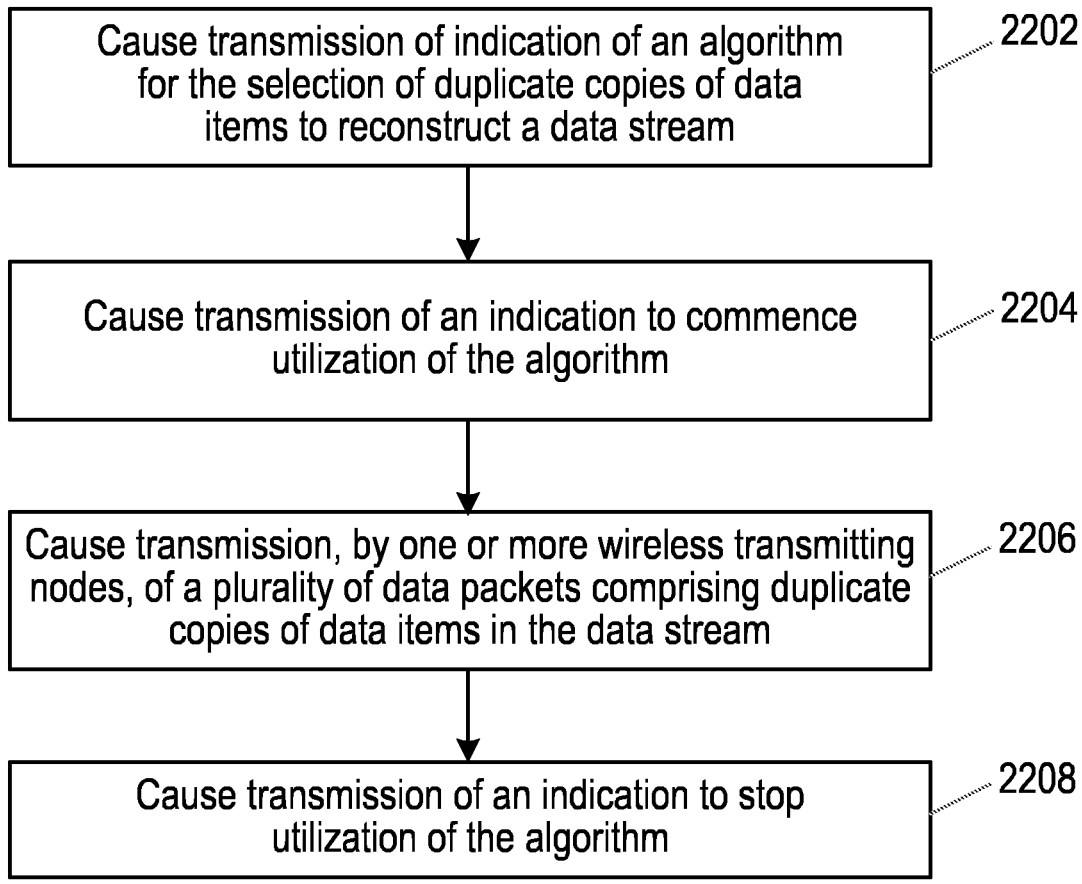
FIG. 22 depicts a method in accordance with particular embodiments of the disclosure.

FIG. 22 depicts a method in accordance with particular embodiments. The method may be performed by a wireless transmitting node, such as a wireless device or UE operating in uplink, or a radio access network node operating in downlink. For example, the method may be performed by the wireless device 1110 or the UE 1200 described above operating in uplink, or the network node 1160 described above (e.g., a base station) operating in downlink. The method may be used to receive data having particularly strict reliability requirements and/or low-latency requirements. For example, the data may be ultra-reliable low-latency communication (URLLC) data or critical machine-type communication (C-MTC) data.

The method involves the transmission, by one or more wireless transmitting nodes, of multiple duplicate copies of data items belonging to the data to be received and reconstructed. In this context, the wireless transmitting node performing the method shown in FIG. 22 may be a first wireless transmitting node of the one or more wireless transmitting nodes. For example, where the one or more wireless transmitting nodes are radio access network nodes operating in a multi-connectivity scheme, the first wireless transmitting node may be a master or primary radio access network node such as a node providing the PCell or SpCell. The duplicate copies of the data items may be sent via different mechanisms, such as via different wireless interfaces (e.g., in which case multiple wireless transmitting nodes may transmit the duplicate copies), via different carriers configured with the same wireless transmitting node (e.g., at different frequencies), and via different spatial streams (e.g., transmitted by different transmission—reception points of the same network node or base station). Thus each data item which belongs to the data to be transmitted is duplicated at least once (and potentially more than once), to provide a plurality of copies which are transmitted via independent transmission mechanisms. The data items which are duplicated may be PDCP PDUs or MAC PDUs, for example. The wireless receiving node receives one or more of the transmitted duplicate copies and, for each data item, selects one or more of the duplicate copies to be used for reconstruction of the original data.

The method begins at step 2202, in which the wireless transmitting node causes the transmission, to one or more wireless receiving nodes, of an indication of an algorithm to be used for the selection of duplicate copies of data stems to reconstruct the data. For example, the transmission may be caused by the first wireless transmitting node performing the transmission itself, or by instructing another node to perform the transmission. The indication may be transmitted via RRC or MAC signalling, for example. The indicated algorithm may be one of a plurality of possible algorithms. In this case, the indication may comprise an index settable to a plurality of values, each associated with a respective algorithm. The indication may be set to a value associated with the indicated algorithm. The association between index values and corresponding algorithms may be pre-configured in the one or more wireless receiving nodes, e.g., via further signalling or programming of the node upon manufacture (e.g. for operation according to a particular wireless standard).

In step 2204, the first wireless transmitting node causes the transmission, to the one or more wireless receiving nodes, of an indication to commence utilization of the algorithm. This indication may comprise an indication that data duplication is about to commence, with multiple duplicate copies of data items to be transmitted by the one or more wireless transmitting nodes. The indication may comprise an indication of the number of duplicate copies that are to be transmitted, and/or the location of the duplicate copies, e.g., the radio resources (e.g., which interface carrier, frequency, time, etc) on which the duplicate copies can be found. The indication in step 2204 may be contained with the same or a different message as the indication of the algorithm to be used, received in step 2202. In the former case, for example where only a single algorithm is implemented in the network, the indication transmitted in step 2204 may implicitly indicate the algorithm that is to be used (i.e., the only algorithm that is implemented). Alternatively, the indication transmitted in step 2202 may comprise an implicit instruction to commence utilization of the algorithm.

In step 2206, the first wireless transmitting node causes the transmission, to the one or more wireless receiving nodes, of a plurality of data packets from the one or more wireless transmitting nodes. The data packets comprise the duplicate copies of the data items, as noted above. For example, each data packet may comprise a respective duplicate copy, such that one copy of each data item is transmitted in each data packet. Also as described above, it will be understood by those skilled in the art that the data packets themselves may not be duplicates of each other, but rather comprise the duplicate copies of the data items. Thus the data packets may comprise other, different data and/or control signalling (e.g., control headers). The duplicate copies of the data items may be sent via different mechanisms, such as via different wireless interfaces (e.g., in which case multiple wireless transmitting nodes may transmit the duplicate copies), via different carriers configured with the same wireless transmitting node (e.g., at different frequencies), and via different spatial streams (e.g., transmitted by different transmission—reception points of the same network node or base station). The first wireless transmitting node may transmit the plurality of data packets itself. Alternatively, the first wireless transmitting node may transmit only a subset (such as one or more) of the plurality of data packets to the wireless receiving node(s) and transmit an instruction to one or more other wireless transmitting nodes to transmit the other data packets. In another alternative, the first wireless transmitting node may transmit none of the data packets itself, but instead instruct one or more other wireless transmitting nodes to transmit the data packets.

Step 2206 may comprise the utilization of a scheduling and/or link adaptation algorithm, in which the number duplicate copies is provided as an input. For example, where the duplicate copies are transmitted over separate transmission paths (e.g., different frequencies, carriers, TRPs, etc), the HARQ operating point (e.g., BLER rate) of each transmission path may be set according to the following equation:

$$\alpha = f(\log PER/N_{sim})$$

α: BLER target of link adaptation of the individual data transmission path.

PER: packet error rate for the transmission of the data as a whole (i.e., taking into account the multiple transmission paths).

$N_{sim}$: the number of simultaneous transmission data paths, such as PDCP data duplication via dual- or multi-connectivity, and/or MAC layer data duplication transmission via Carrier Aggregation, and/or spatial duplicate transmissions via different physical transmission points.

Thereafter, the wireless receiving node utilizes the algorithm indicated in step 2202 to select, based on the respective times at which each of the plurality of data packets transmitted in step 2006 were received, for each of the data items in the data to be reconstructed, one or more of the duplicate copies for reconstruction of the data. Various different algorithms may be utilized.

In step 2208, the first wireless transmitting node causes the transmission, to the wireless receiving node(s), of an indication or an instruction to stop or halt utilization of the algorithm. For example, the indication may comprise an indication that data duplication is to be ceased. Responsive to receipt of the indication, the wireless receiving node stops selecting duplicate copies for reconstruction of the data.

Figure 23:
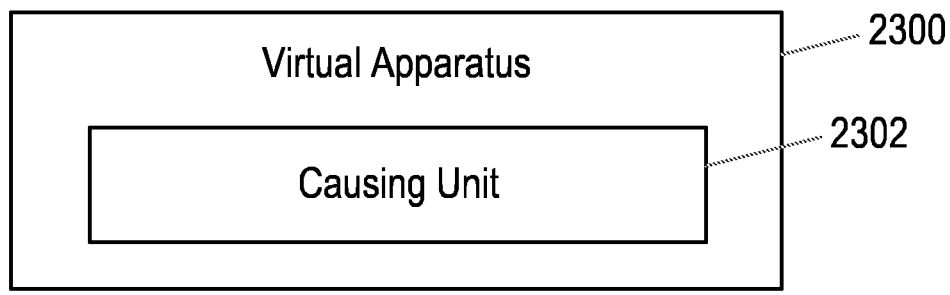
FIG. 23 illustrates a schematic block diagram of an apparatus in a wireless network.

FIG. 23 illustrates a schematic block diagram of an apparatus 2300 in a wireless network (for example, the wireless network shown in FIG. 11). The apparatus may be implemented in a wireless transmitting node, such as a wireless device operating in uplink or a network node operating in downlink (e.g., wireless device 1110 or network node 1160 shown in FIG. 11). Apparatus 2300 is operable to carry out the example method described with reference to FIG. 22 and possibly any other processes or methods disclosed herein. It is also to be understood that the method of FIG. 22 is not necessarily carried out solely by apparatus 2300. At least some operations of the method can be performed by one or more other entities.

Virtual Apparatus 2300 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause causing unit 2302, and any other suitable units of apparatus 2300 to perform corresponding functions according one or more embodiments of the present disclosure.

In the following, the apparatus 2300 is implemented in an entity referred to as a first wireless transmitting node. As illustrated in FIG. 23, apparatus 2300 includes causing unit 2302. Causing unit 2302 is configured to cause transmission of a plurality of data packets to the wireless receiving node, by one or more wireless transmitting nodes comprising the first wireless transmitting node. Each data packet comprises respective duplicate copies of data items belonging to the data stream. Causing unit 2302 is further configured to cause transmission to the wireless receiving node of an indication of an algorithm to be used by the wireless receiving node to select, based on respective times at which the data packets are received, for each position in the sequence, one or more of the duplicate copies of data items for reconstruction of the data stream.

In particular embodiments, the indication may comprise an indication of an ordinal number of the duplicate copy to be selected for each position in the sequence, when the duplicate copies for each position are ordered according to the respective times at which the duplicate copies (e.g., the data packets comprising the duplicate copies) are received. For example, the indication may indicate that the duplicate copy which is first received should be selected.

In further embodiments, causing unit 2302 may additionally be configured to cause transmission, to the wireless receiving node, of an indication to commence utilization of the algorithm for reconstruction of the data stream. The indication to commence utilization of the algorithm may be transmitted in the same message as the indication of the algorithm, and may, in some embodiments, comprise the same indication. In the latter case, for example, the wireless receiving device may be pre-configured with the algorithm to be used (or only one algorithm may be defined in the wireless network), in which case the indication to commence utilization of the algorithm is an implicit indication of the algorithm to be used.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

For the avoidance of doubt, the following numbered statements set out embodiments of the disclosure.

Group A Embodiments

1. A method performed by a wireless receiving node for receiving a data stream from one or more wireless transmitting nodes, the data stream comprising a sequence of data items, the method comprising:
   receiving a plurality of data packets from the one or more wireless transmitting nodes, each data packet comprising respective duplicate copies of data items belonging to the data stream; and
   utilizing an algorithm to select, based on respective times at which the data packets are received, for each position in the sequence, one or more of the duplicate copies of data items for reconstruction of the data stream.
2. The method of embodiment 1, further comprising receiving an indication of the algorithm from a wireless transmitting node of the one or more wireless transmitting nodes.
3. The method of embodiment 2, wherein the indication of the algorithm is received via radio resource control, RRC, or medium access control, MAC signaling.
4. The method of embodiment 2 or 3, wherein the algorithm is one of a plurality of candidate algorithms, wherein the indication comprises an index settable to a plurality of values associated with the plurality of candidate algorithms, and wherein the index is set to a value associated with the algorithm.
5. The method of any one of embodiments 2 to 4, wherein the indication comprises an indication of an ordinal number of the duplicate copy to be selected for each position in the sequence, when the duplicate copies for each position are ordered according to the respective times at which the data packets are received.
6. The method of any one of the preceding embodiments, wherein the step of utilizing an algorithm comprises selecting, for each position in the sequence, a duplicate copy corresponding to the kth duplicate copy when the duplicate copies for each position are ordered according to the respective times at which the data packets are received, wherein k is an integer.

7. The method of embodiment 6, wherein k is equal to one.
8. The method of any one of the preceding embodiments, wherein the step of utilizing an algorithm comprises selecting, for each position in the sequence, a duplicate copy corresponding to the median duplicate copy when the duplicate copies for each position are ordered according to the respective times at which the data packets are received.
9. The method of any one of the preceding embodiments, further comprising receiving an indication to commence utilization of the algorithm for reconstruction of the data stream.
10. The method of embodiment 9 when directly or indirectly dependent on embodiment 2, wherein the indication to commence utilization of the algorithm for reconstruction of the data stream is comprised within a same message as the indication of the algorithm.
11. The method of embodiment 10, wherein the indication to commence utilization of the algorithm for reconstruction of the data stream is the same indication as the indication of the algorithm.
12. The method of any one of embodiments 9 to 11, wherein the indication to commence utilization of the algorithm for reconstruction of the data stream comprises an indication of a number of carriers over which the plurality of data packets or the duplicate copies of the data items are transmitted.
13. The method of any one of embodiments 9 to 12, wherein the indication to commence utilization of the algorithm for reconstruction of the data stream comprises an indication of radio resources on which the plurality of data packets or the duplicate copies of the data items are transmitted.
14. The method of any one of the preceding embodiments, further comprising receiving an indication to stop utilization of the algorithm for reconstruction of the data stream.
15. The method according to any one of the preceding embodiments, wherein the data units comprise Packet Data Convergence Protocol, PDCP, protocol data units.
16. The method according to any one of embodiments 1 to 14, wherein the data units comprise Medium Access Control, MAC, protocol data units.
17. The method of any one of the preceding embodiments, wherein the plurality of data packets are transmitted over respective carriers of a plurality of carriers.
18. The method according to embodiment 17, wherein two or more of the plurality of carriers are configured between the wireless receiving node and a single wireless transmitting node.
19. The method according to embodiments 17 or 18, wherein the plurality of carriers comprise a first carrier configured between the wireless receiving node and a first wireless transmitting node, and a second carrier configured between the wireless receiving node and a second wireless transmitting node.
20. The method according to any one of the preceding embodiments, wherein the wireless receiving node is a wireless user device and wherein the one or more wireless transmitting nodes are wireless radio access network nodes.
21. The method according to any one of embodiments 1 to 19, wherein the wireless receiving node is a wireless radio access network node and wherein the one or more wireless transmitting nodes comprise a wireless user device.
22. The method according to any one of the preceding embodiments, wherein the data stream relates to ultra-reliable, low-latency communication.
23. The method of any of the previous embodiments, further comprising:
obtaining user data from the reconstruction of the data stream; and
forwarding the user data to a host computer.

Group B Embodiments

24. A method performed by a first wireless transmitting node for transmitting a data stream to a wireless receiving node, the data stream comprising a sequence of data items, the method comprising:
causing transmission of a plurality of data packets to the wireless receiving node, by one or more wireless transmitting nodes comprising the first wireless transmitting node, each data packet comprising respective duplicate copies of data items belonging to the data stream; and
causing transmission to the wireless receiving node of an indication of an algorithm to be used by the wireless receiving node to select, based on respective times at which the data packets are received, for each position in the sequence, one or more of the duplicate copies of data items for reconstruction of the data stream.
25. The method of embodiment 24, wherein the indication of the algorithm is transmitted via radio resource control, RRC, or medium access control, MAC signaling.
26. The method of embodiment 24 or 25, wherein the algorithm is one of a plurality of candidate algorithms, wherein the indication comprises an index settable to a plurality of values associated with the plurality of candidate algorithms, and wherein the index is set to a value associated with the algorithm.
27. The method of any one of embodiments 24 to 26, wherein the indication comprises an indication of an ordinal number of the duplicate copy to be selected for each position in the sequence, when the duplicate copies for each position are ordered by the wireless receiving node according to the respective times at which the data packets are received.
28. The method of any one of embodiments 24 to 27, wherein the algorithm to be used comprises the wireless receiving node selecting, for each position in the sequence, a duplicate copy corresponding to the kth duplicate copy when the duplicate copies for each position are ordered according to the respective times at which the data packets are received, wherein k is an integer.
29. The method of embodiment 28, wherein k is equal to one.
30. The method of any one of embodiments 24 to 29, wherein the algorithm to be used comprises the wireless receiving node selecting, for each position in the sequence, a duplicate copy corresponding to the median duplicate copy when the duplicate copies for each position are ordered according to the respective times at which the data packets are received.
31. The method of any one of embodiments 24 to 30, further comprising causing transmission, to the wireless receiving node, of an indication to commence utilization of the algorithm for reconstruction of the data stream.

32. The method of embodiment 31, wherein the indication to commence utilization of the algorithm for reconstruction of the data stream is comprised within a same message as the indication of the algorithm.

33. The method of embodiment 32, wherein the indication to commence utilization of the algorithm for reconstruction of the data stream is the same indication as the indication of the algorithm.

34. The method of any one of embodiments 31 to 33, wherein the indication to commence utilization of the algorithm for reconstruction of the data stream comprises an indication of a number of carriers over which the plurality of data packets or the duplicate copies of the data items are transmitted.

35. The method of any one of embodiments 31 to 34, wherein the indication to commence utilization of the algorithm for reconstruction of the data stream comprises an indication of radio resources on which the plurality of data packets or the duplicate copies of the data items are transmitted.

36. The method of any one of embodiments 24 to 35, further comprising causing transmission, to the wireless receive node, of an indication to stop utilization of the algorithm for reconstruction of the data stream.

37. The method according to any one of embodiments 24 to 36, wherein the data units comprise Packet Data Convergence Protocol, PDCP, protocol data units.

38. The method according to any one of embodiments 24 to 36, wherein the data units comprise Medium Access Control, MAC, protocol data units.

39. The method of any one of embodiments 24 to 38, wherein the plurality of data packets are transmitted over respective carriers of a plurality of carriers.

40. The method according to embodiment 39, wherein two or more of the plurality of carriers are configured between the wireless receiving node and the first wireless transmitting node.

41. The method according to embodiments 39 or 40, wherein the plurality of carriers comprise a first carrier configured between the wireless receiving node and the first wireless transmitting node, and a second carrier configured between the wireless receiving node and a second wireless transmitting node.

42. The method according to any one of embodiments 24 to 41, wherein the wireless receiving node is a wireless user device and wherein the one or more wireless transmitting nodes are wireless radio access network nodes.

43. The method according to any one of embodiments 24 to 41, wherein the wireless receiving node is a wireless radio access network node and wherein the one or more wireless transmitting nodes comprise a wireless user device.

44. The method according to any one of embodiments 24 to 43, wherein the data stream relates to ultra-reliable, low-latency communication.

45. The method of any of the previous embodiments, further comprising:
providing user data; and
forwarding the user data to a host computer via the transmission to the wireless receiving node.

Group C Embodiments

46. A wireless receiving node, the wireless receiving node comprising:
processing circuitry configured to perform any of the steps of any of the Group A embodiments; and
power supply circuitry configured to supply power to the wireless receiving node.

47. A wireless transmitting node, the wireless transmitting node comprising:
processing circuitry configured to perform any of the steps of any of the Group B embodiments; and
power supply circuitry configured to supply power to the wireless transmitting node.

48. A wireless device, the wireless device comprising:
processing circuitry configured to perform any of the steps of any of the Group A or Group B embodiments; and
power supply circuitry configured to supply power to the wireless device.

49. A base station, the base station comprising:
processing circuitry configured to perform any of the steps of any of the Group A or Group B embodiments;
power supply circuitry configured to supply power to the base station.

50. A user equipment (UE), the UE comprising:
an antenna configured to send and receive wireless signals;
radio front-end circuitry connected to the antenna and to processing circuitry, and configured to condition signals communicated between the antenna and the processing circuitry;
the processing circuitry being configured to perform any of the steps of any of the Group A or Group B embodiments;
an input interface connected to the processing circuitry and configured to allow input of information into the UE to be processed by the processing circuitry;
an output interface connected to the processing circuitry and configured to output information from the UE that has been processed by the processing circuitry; and
a battery connected to the processing circuitry and configured to supply power to the UE.

51. A communication system including a host computer comprising:
processing circuitry configured to provide user data; and
a communication interface configured to forward the user data to a cellular network for transmission to a user equipment (UE),
wherein the cellular network comprises a base station having a radio interface and processing circuitry, the base station's processing circuitry configured to perform any of the steps of any of the Group A or Group B embodiments.

52. The communication system of the previous embodiment further including the base station.

53. The communication system of the previous 2 embodiments, further including the UE, wherein the UE is configured to communicate with the base station.

54. The communication system of the previous 3 embodiments, wherein:
the processing circuitry of the host computer is configured to execute a host application, thereby providing the user data; and
the UE comprises processing circuitry configured to execute a client application associated with the host application.

55. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the base station performs any of the steps of any of the Group A or Group B embodiments.

56. The method of the previous embodiment, further comprising, at the base station, transmitting the user data.

57. The method of the previous 2 embodiments, wherein the user data is provided at the host computer by executing a host application, the method further comprising, at the UE, executing a client application associated with the host application.

58. A user equipment (UE) configured to communicate with a base station, the UE comprising a radio interface and processing circuitry configured to performs the of the previous 3 embodiments.

59. A communication system including a host computer comprising:
processing circuitry configured to provide user data; and
a communication interface configured to forward user data to a cellular network for transmission to a user equipment (UE),
wherein the UE comprises a radio interface and processing circuitry, the UE's components configured to perform any of the steps of any of the Group A or Group B embodiments.

60. The communication system of the previous embodiment, wherein the cellular network further includes a base station configured to communicate with the UE.

61. The communication system of the previous 2 embodiments, wherein:
the processing circuitry of the host computer is configured to execute a host application, thereby providing the user data; and
the UE's processing circuitry is configured to execute a client application associated with the host application.

62. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the UE performs any of the steps of any of the Group A or Group B embodiments.

63. The method of the previous embodiment, further comprising at the UE, receiving the user data from the base station.

64. A communication system including a host computer comprising:
communication interface configured to receive user data originating from a transmission from a user equipment (UE) to a base station,
wherein the UE comprises a radio interface and processing circuitry, the UE's processing circuitry configured to perform any of the steps of any of the Group A or Group B embodiments.

65. The communication system of the previous embodiment, further including the UE.

66. The communication system of the previous 2 embodiments, further including the base station, wherein the base station comprises a radio interface configured to communicate with the UE and a communication interface configured to forward to the host computer the user data carried by a transmission from the UE to the base station.

67. The communication system of the previous 3 embodiments, wherein:
the processing circuitry of the host computer is configured to execute a host application; and
the UE's processing circuitry is configured to execute a client application associated with the host application, thereby providing the user data.

68. The communication system of the previous 4 embodiments, wherein:
the processing circuitry of the host computer is configured to execute a host application, thereby providing request data; and
the UE's processing circuitry is configured to execute a client application associated with the host application, thereby providing the user data in response to the request data.

69. A method implemented in a communication system including a host computer, a base station and a user equipment (UE), the method comprising:
at the host computer, receiving user data transmitted to the base station from the UE, wherein the UE performs any of the steps of any of the Group A or Group B embodiments.

70. The method of the previous embodiment, further comprising, at the UE, providing the user data to the base station.

71. The method of the previous 2 embodiments, further comprising:
at the UE, executing a client application, thereby providing the user data to be transmitted; and
at the host computer, executing a host application associated with the client application.

72. The method of the previous 3 embodiments, further comprising:
at the UE, executing a client application; and
at the UE, receiving input data to the client application, the input data being provided at the host computer by executing a host application associated with the client application,
wherein the user data to be transmitted is provided by the client application in response to the input data.

73. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of the Group A or Group B embodiments.

74. The communication system of the previous embodiment further including the base station.

75. The communication system of the previous 2 embodiments, further including the UE, wherein the UE is configured to communicate with the base station.

76. The communication system of the previous 3 embodiments, wherein:
the processing circuitry of the host computer is configured to execute a host application;

the UE is configured to execute a client application associated with the host application, thereby providing the user data to be received by the host computer.

77. A method implemented in a communication system including a host computer, a base station and a user equipment (UE), the method comprising:
at the host computer, receiving, from the base station, user data originating from a transmission which the base station has received from the UE, wherein the UE performs any of the steps of any of the Group A or Group B embodiments.

78. The method of the previous embodiment, further comprising at the base station, receiving the user data from the UE.

79. The method of the previous 2 embodiments, further comprising at the base station, initiating a transmission of the received user data to the host computer.

The invention claimed is:

1. A method performed by a wireless receiving node for receiving a data stream from one or more wireless transmitting nodes, the data stream comprising a sequence of data items, the method comprising:
receiving an indication of an algorithm from a wireless transmitting node of the one or more wireless transmitting nodes, wherein the algorithm is one of a plurality of candidate algorithms, wherein the indication comprises an index settable to a plurality of values associated with the plurality of candidate algorithms, and wherein the index is set to a value associated with the algorithm;
receiving a plurality of data packets from the one or more wireless transmitting nodes, each data packet comprising respective duplicate copies of data items belonging to the data stream; and
utilizing the algorithm to select, based on respective times at which the data packets are received, for each position in the sequence, one or more of the duplicate copies of data items for reconstruction of the data stream.

2. The method of claim 1, wherein the indication comprises an indication of an ordinal number of the duplicate copy to be selected for each position in the sequence, when the duplicate copies for each position are ordered according to the respective times at which the data packets are received.

3. The method of claim 1, wherein the step of utilizing an algorithm comprises selecting, for each position in the sequence, a duplicate copy corresponding to the kth duplicate copy when the duplicate copies for each position are ordered according to the respective times at which the data packets are received, wherein k is an integer.

4. The method of claim 3, wherein k is equal to one.

5. The method of claim 1, wherein the step of utilizing an algorithm comprises selecting, for each position in the sequence, a duplicate copy corresponding to the median duplicate copy when the duplicate copies for each position are ordered according to the respective times at which the data packets are received.

6. The method of claim 1, further comprising receiving an indication to commence utilization of the algorithm for reconstruction of the data stream.

7. The method of claim 6, wherein the indication to commence utilization of the algorithm for reconstruction of the data stream comprises an indication of a number of carriers over which the plurality of data packets or the duplicate copies of the data items are transmitted, and/or wherein the indication to commence utilization of the algorithm for reconstruction of the data stream comprises an indication of radio resources on which the plurality of data packets or the duplicate copies of the data items are transmitted.

8. The method of claim 1, further comprising receiving an indication to stop utilization of the algorithm for reconstruction of the data stream.

9. The method of claim 1, wherein the plurality of data packets are transmitted over respective carriers of a plurality of carriers.

10. The method of claim 1, wherein the plurality of data packets are received via a plurality of user equipments.

11. A wireless receiving node, for receiving a data stream from one or more wireless transmitting nodes, the data stream comprising a sequence of data items, wherein the wireless receiving node is configured to perform the steps of the method according to claim 1.

12. A method performed by a first wireless transmitting node for transmitting a data stream to a wireless receiving node, the data stream comprising a sequence of data items, the method comprising:
causing transmission of a plurality of data packets to the wireless receiving node, by one or more wireless transmitting nodes, comprising the first wireless transmitting node, each data packet comprising respective duplicate copies of data items belonging to the data stream; and
causing transmission to the wireless receiving node of an indication of an algorithm to be used by the wireless receiving node to select, based on respective times at which the data packets are received, for each position in the sequence, one or more of the duplicate copies of data items for reconstruction of the data stream, wherein the algorithm is one of a plurality of candidate algorithms, wherein the indication comprises an index settable to a plurality of values associated with the plurality of candidate algorithms, and wherein the index is set to a value associated with the algorithm.

13. The method of claim 12, wherein the indication comprises an indication of an ordinal number of the duplicate copy to be selected for each position in the sequence, when the duplicate copies for each position are ordered by the wireless receiving node according to the respective times at which the data packets are received.

14. The method of claim 12, wherein the algorithm to be used comprises the wireless receiving node selecting, for each position in the sequence, a duplicate copy corresponding to the kth duplicate copy when the duplicate copies for each position are ordered according to the respective times at which the data packets are received, wherein k is an integer.

15. The method of claim 14, wherein k is equal to one.

16. The method of claim 12, wherein the algorithm to be used comprises the wireless receiving node selecting, for each position in the sequence, a duplicate copy corresponding to the median duplicate copy when the duplicate copies for each position are ordered according to the respective times at which the data packets are received.

17. The method of claim 12, further comprising causing transmission, to the wireless receiving node, of an indication to commence utilization of the algorithm for reconstruction of the data stream.

18. The method of claim 17, wherein the indication to commence utilization of the algorithm for reconstruction of the data stream is comprised within a same message as the indication of the algorithm, and/or wherein the indication to commence utilization of the algorithm for reconstruction of the data stream is the same indication as the indication of the algorithm, and/or wherein the indication to commence utilization of the algorithm for reconstruction of the data stream comprises an indication of a number of carriers over which the plurality of data packets or the duplicate copies of the data items are transmitted, and/or wherein the indication to commence utilization of the algorithm for reconstruction of the data stream comprises an indication of radio resources on which the plurality of data packets or the duplicate copies of the data items are transmitted.

19. The method of claim 12, wherein the plurality of data packets are transmitted over respective carriers of a plurality of carriers.

20. A wireless transmitting node, for transmitting a data stream to a wireless receiving node, the data stream comprising a sequence of data items, wherein the wireless transmitting node is configured to perform the method according to claim 12.

\* \* \* \* \*